(12) United States Patent
Rivera

(10) Patent No.: US 11,464,357 B2
(45) Date of Patent: Oct. 11, 2022

(54) BEVERAGE BREWER WITH MULTI- AND SINGLE-CUP MODES

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 366 days.

(21) Appl. No.: 16/378,558

(22) Filed: Apr. 8, 2019

(65) Prior Publication Data

US 2019/0328173 A1    Oct. 31, 2019

Related U.S. Application Data

(63) Continuation-in-part of application No. 15/046,757, filed on Feb. 18, 2016, now Pat. No. 10,251,509, which is a continuation-in-part of application No. 12/762,262, filed on Apr. 16, 2010, now Pat. No. 9,844,292, which is a continuation-in-part of application No. 12/620,584, filed on Nov. 17, 2009, now Pat. No. 8,291,812, which is a continuation-in-part of application No. 12/610,181, filed on Oct. 30, 2009, now Pat. No. 8,621,981.

(51) Int. Cl.
*A47J 31/52* (2006.01)
*A47J 31/44* (2006.01)

(52) U.S. Cl.
CPC ......... *A47J 31/525* (2018.08); *A47J 31/4435* (2013.01)

(58) Field of Classification Search
CPC .. A47J 31/525; A47J 31/4435; A47J 31/0647; A47J 31/446; B67D 3/0022; G07F 13/06
USPC .............. 99/279–283, 284–304, 305–323.3; 111/109, 116; 222/108, 109; 141/41–88
See application file for complete search history.

(56) References Cited

U.S. PATENT DOCUMENTS

| | | |
|---|---|---|
| X237404 | 2/1881 | McKeever |
| 2,013,172 A | 9/1935 | Petrone |
| 2,433,815 A | 12/1947 | LaForge |
| 2,673,111 A | 3/1954 | Teetor |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenberg et al. |

(Continued)

FOREIGN PATENT DOCUMENTS

| | | |
|---|---|---|
| WO | 2005092160 A1 | 10/2005 |
| WO | 2008006556 A2 | 1/2008 |

*Primary Examiner* — Tu B Hoang
*Assistant Examiner* — Diallo I Duniver
(74) *Attorney, Agent, or Firm* — IP Strategies

(57) ABSTRACT

A multi-mode beverage brewer includes a body, a brewing chamber in the body configured to receive beverage brewing material, a flow controller in the body, a selector, and a tray. The flow controller is configured to control a flow of water to the brewing chamber such that in a first mode a first quantity of water or in a second mode a second quantity of water is provided to the brew chamber. The selector is configured to actuate the first mode or the second mode of the flow controller. The tray is configured to support a brewed beverage container to receive a brewed beverage from the brewing chamber. The selector is configured as a magnet and a magnetic sensing element. One each of the magnet and the magnetic sensing element is arranged in the body and in the tray.

20 Claims, 31 Drawing Sheets

(56) References Cited

U.S. PATENT DOCUMENTS

| | | | |
|---|---|---|---|
| 3,384,004 A | 5/1968 | Perlman et al. |
| 3,405,630 A | 10/1968 | Weber, III |
| 3,431,002 A | 3/1969 | Melgaard |
| 3,583,308 A | 6/1971 | Williams |
| 3,607,297 A | 9/1971 | Fasano |
| 3,757,670 A | 9/1973 | Laama et al. |
| 3,844,206 A | 10/1974 | Weber |
| 3,958,502 A | 5/1976 | Vitous |
| 4,164,644 A | 8/1979 | Remsnyder et al. |
| 4,253,385 A | 3/1981 | Illy |
| 4,286,515 A | 9/1981 | Baumann et al. |
| 4,508,023 A | 4/1985 | Naya et al. |
| 4,603,621 A | 8/1986 | Roberts |
| 4,703,687 A | 11/1987 | Wei |
| 4,998,463 A | 3/1991 | Precht et al. |
| 5,000,082 A | 3/1991 | Lassota |
| 5,046,409 A | 9/1991 | Henn |
| 5,123,335 A | 6/1992 | Aselu |
| 5,183,998 A * | 2/1993 | Hoffman .............. A47J 31/5253 219/492 |
| 5,233,914 A | 8/1993 | English |
| 5,325,765 A | 7/1994 | Sylvan et al. |
| 5,335,589 A | 8/1994 | Yerves, Jr. et al. |
| 5,526,733 A | 6/1996 | Klawuhn et al. |
| 5,540,263 A * | 7/1996 | Hustvedt .............. B67D 3/0022 141/103 |
| 5,582,730 A | 12/1996 | Hugentobler |
| 5,636,563 A | 6/1997 | Oppermann et al. |
| 5,676,041 A | 10/1997 | Glucksman et al. |
| 5,829,340 A | 11/1998 | Yang |
| 5,840,189 A | 11/1998 | Sylvan et al. |
| 5,870,943 A | 2/1999 | Levi et al. |
| 5,875,704 A | 3/1999 | Levi et al. |
| 5,887,508 A | 3/1999 | Estaun |
| 5,921,783 A | 7/1999 | Fritsch et al. |
| 6,118,933 A | 9/2000 | Roberson |
| D431,423 S | 10/2000 | Ohm et al. |
| 6,136,352 A | 10/2000 | Silverstein et al. |
| 6,164,191 A | 12/2000 | Liu et al. |
| 6,189,438 B1 | 2/2001 | Bielfeldt et al. |
| 6,339,985 B1 | 1/2002 | Whitney |
| 6,606,938 B2 | 8/2003 | Taylor |
| 6,655,260 B2 | 12/2003 | Lazaris et al. |
| 6,740,345 B2 | 5/2004 | Cai |
| 6,832,542 B2 | 12/2004 | Hu et al. |
| 6,843,165 B2 | 1/2005 | Stoner |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,131,369 B2 | 11/2006 | Gantt et al. |
| 7,320,274 B2 | 1/2008 | Castellani |
| 7,328,651 B2 * | 2/2008 | Halliday .............. A47J 31/0673 426/115 |
| 7,946,217 B2 | 5/2011 | Favre et al. |
| 8,047,127 B2 | 11/2011 | Lin |
| 2002/0035929 A1 | 3/2002 | Kanba et al. |
| 2002/0148356 A1 | 10/2002 | Lazaris et al. |
| 2004/0118290 A1 | 6/2004 | Cai |
| 2005/0279216 A1 | 12/2005 | Miller |
| 2006/0159815 A1 | 7/2006 | Crook et al. |
| 2006/0196364 A1 | 9/2006 | Kirschner |
| 2006/0254428 A1 | 11/2006 | Glucksman et al. |
| 2007/0209521 A1 | 9/2007 | Boussemart et al. |
| 2008/0000357 A1 * | 1/2008 | Yang .................... A47J 31/3685 99/279 |
| 2008/0148954 A1 | 6/2008 | Maldanis |
| 2009/0020017 A1 | 1/2009 | Lin et al. |
| 2009/0229471 A1 | 9/2009 | Lun et al. |
| 2010/0083843 A1 | 4/2010 | Denisart et al. |

* cited by examiner

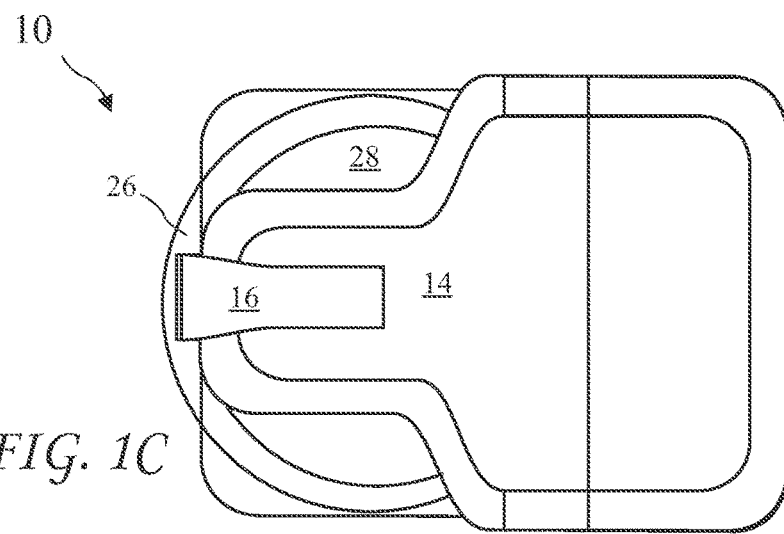
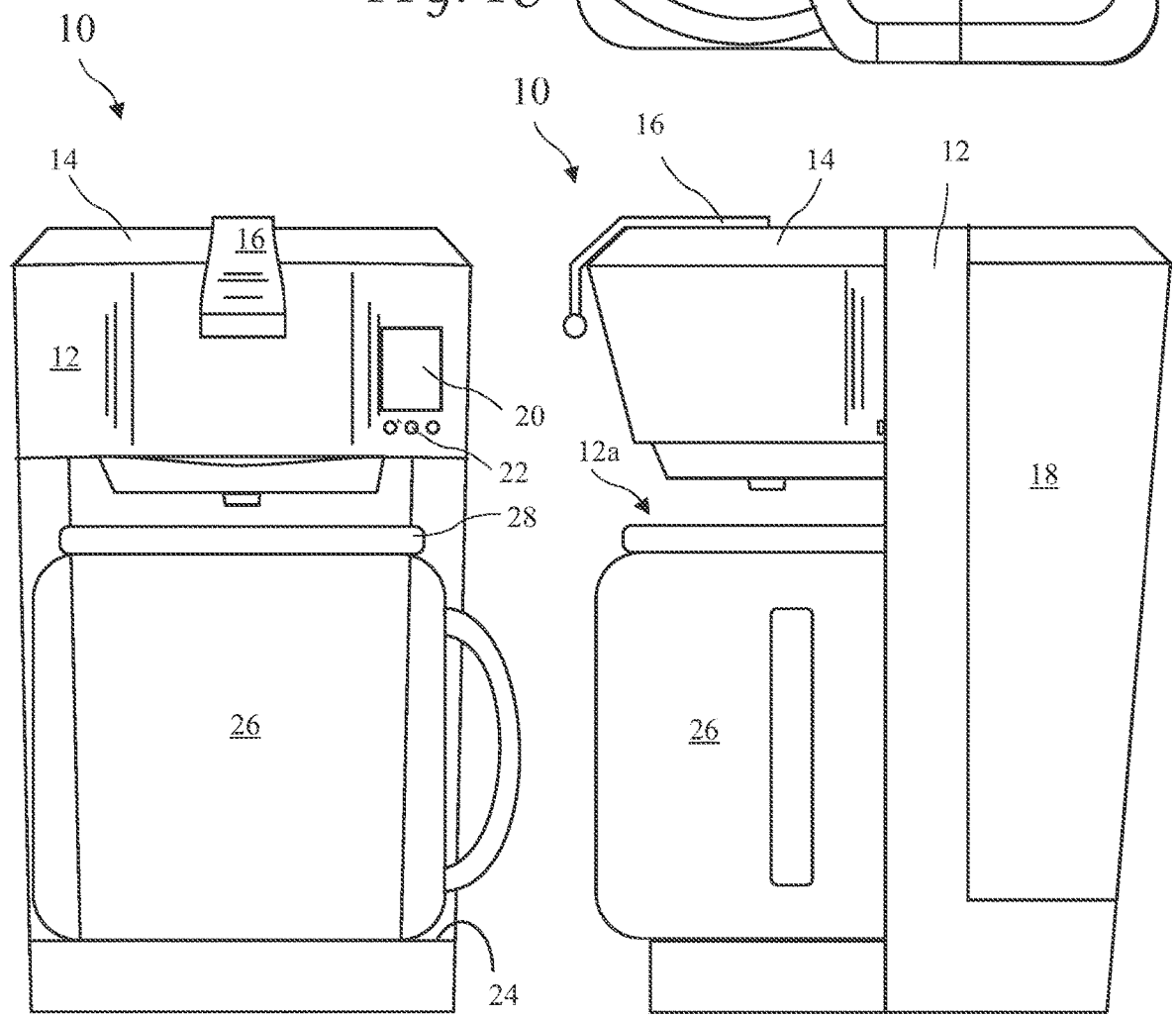
FIG. 1C
FIG. 1A
FIG. 1B

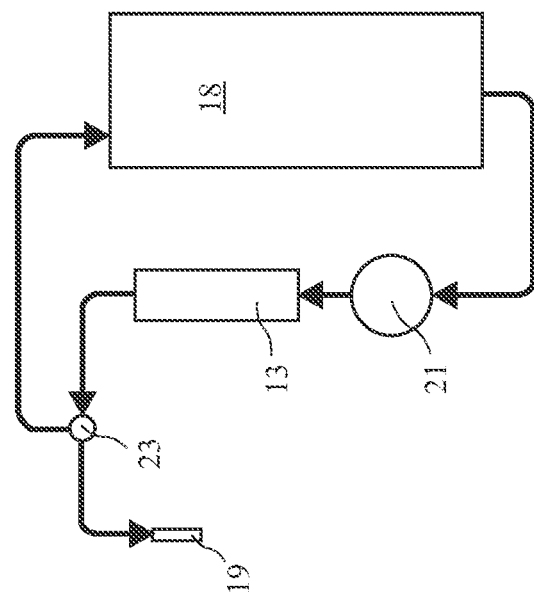
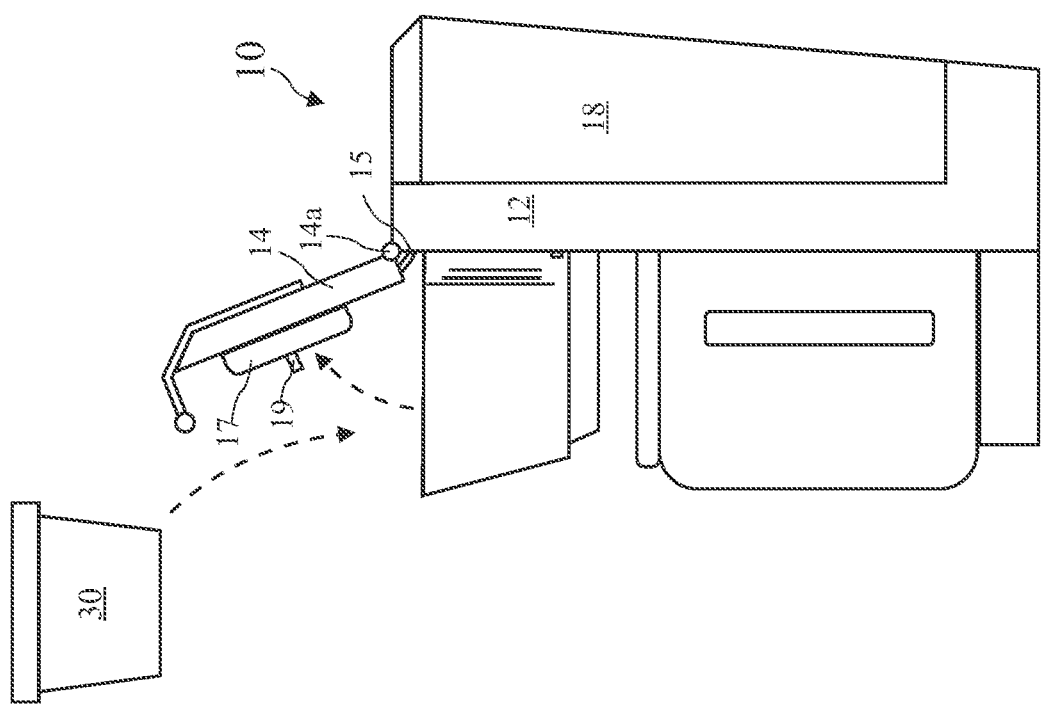

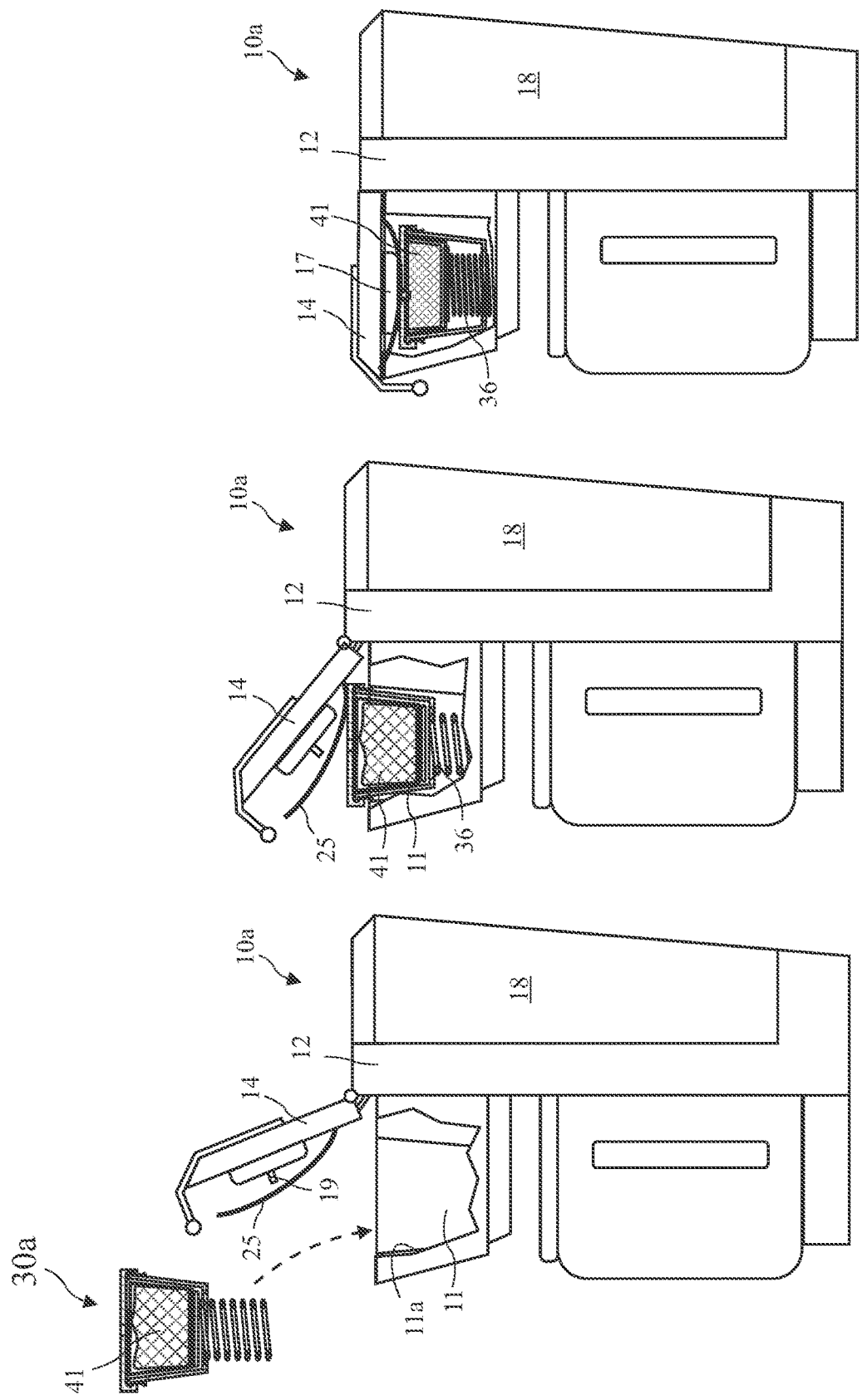

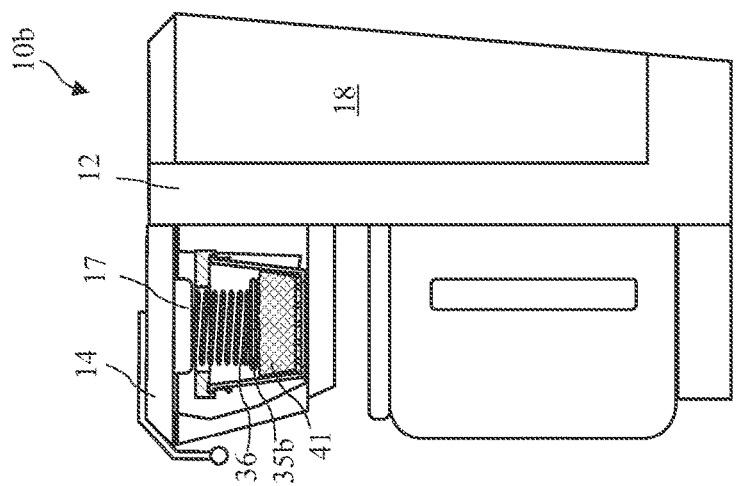
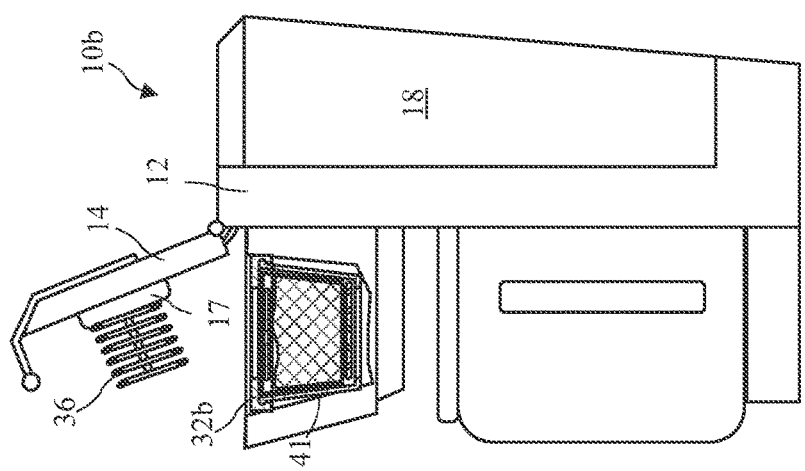
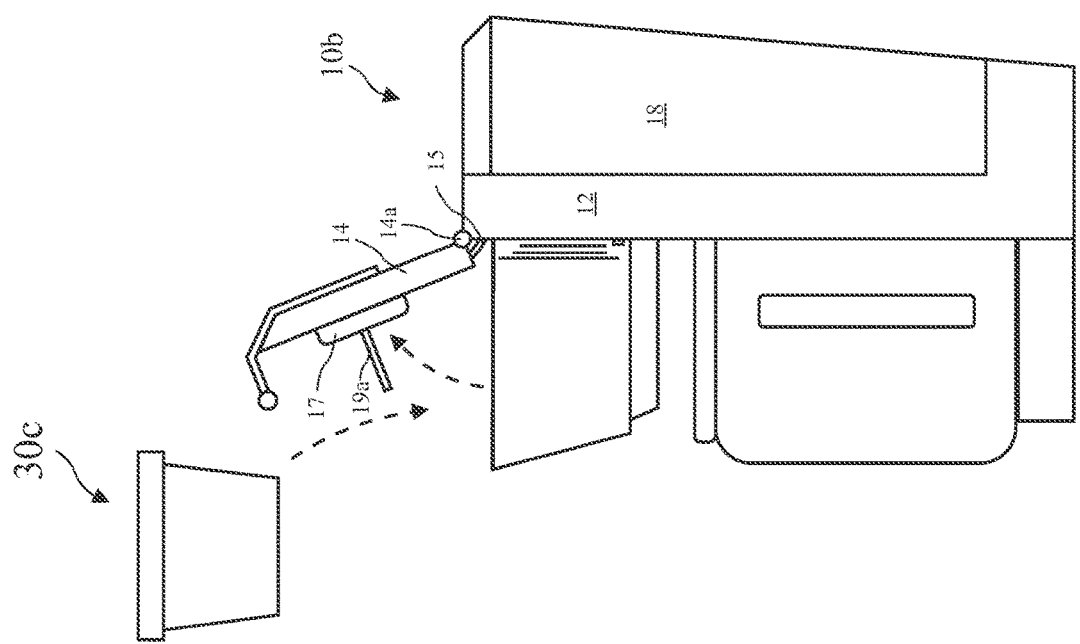

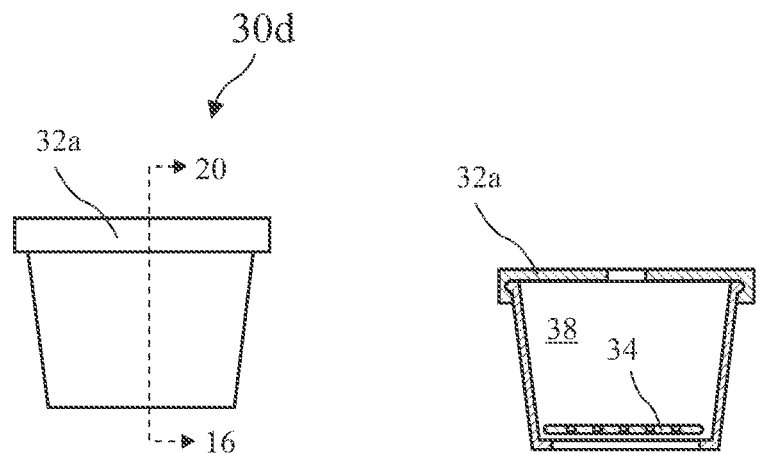
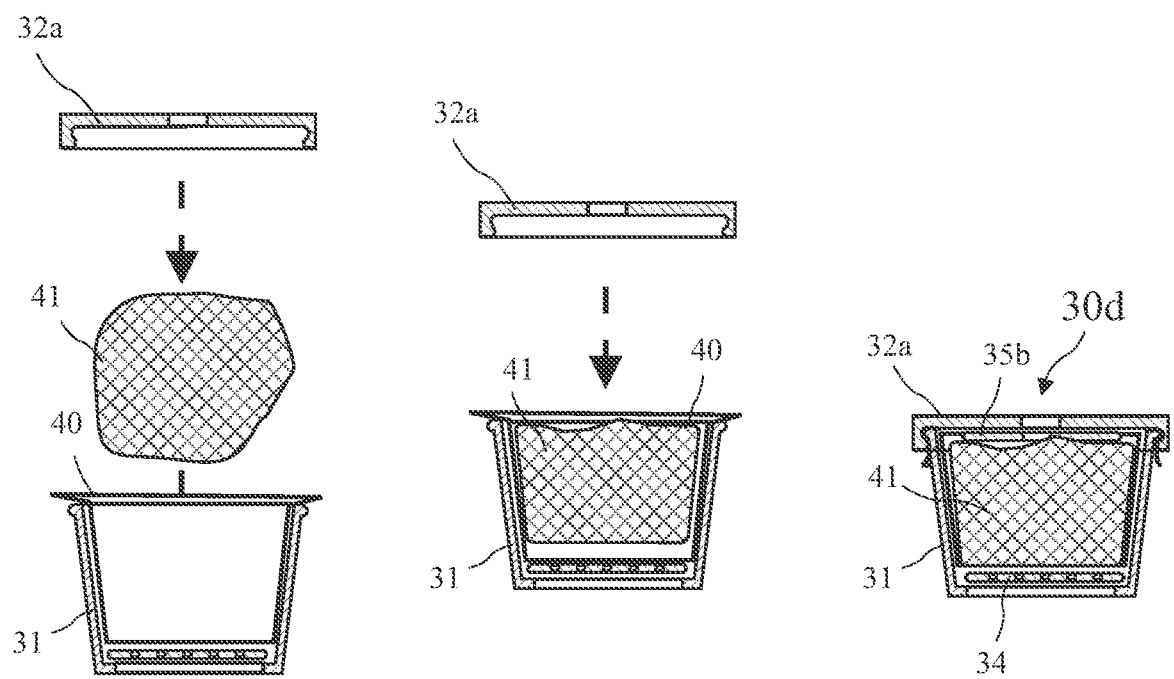
FIG. 19  FIG. 20
FIG. 21A  FIG. 21B  FIG. 21C

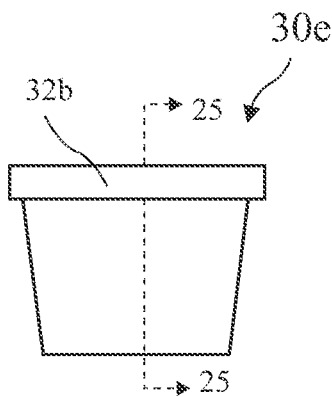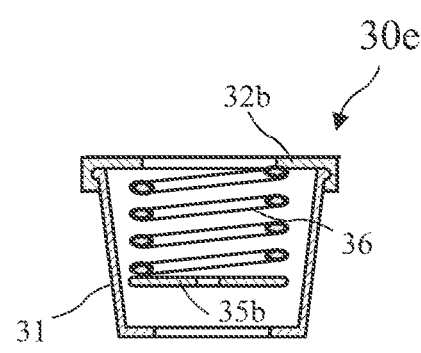
FIG. 24  FIG. 25
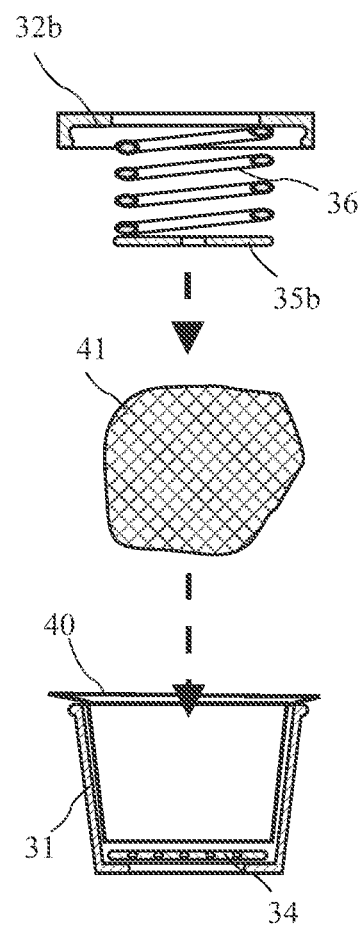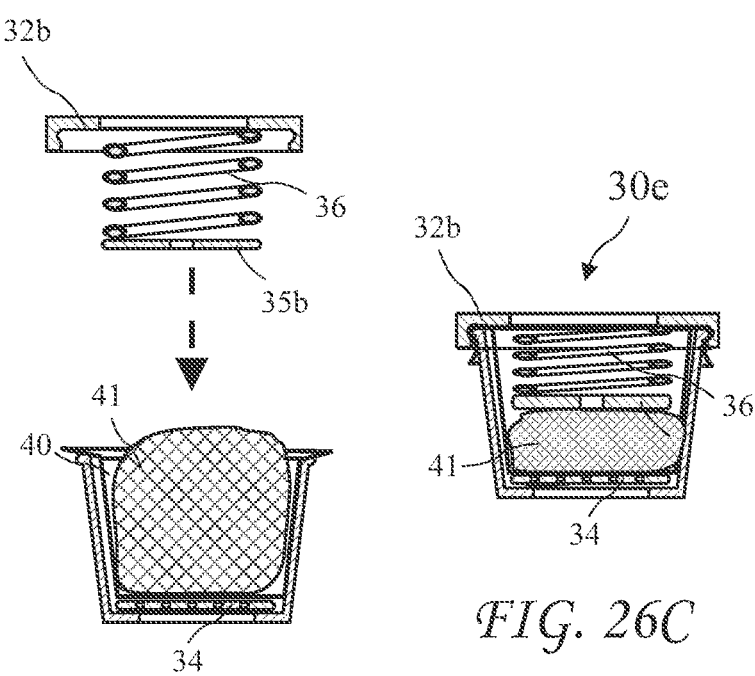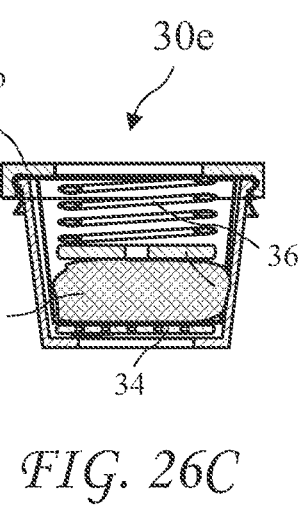
FIG. 26A  FIG. 26B  FIG. 26C

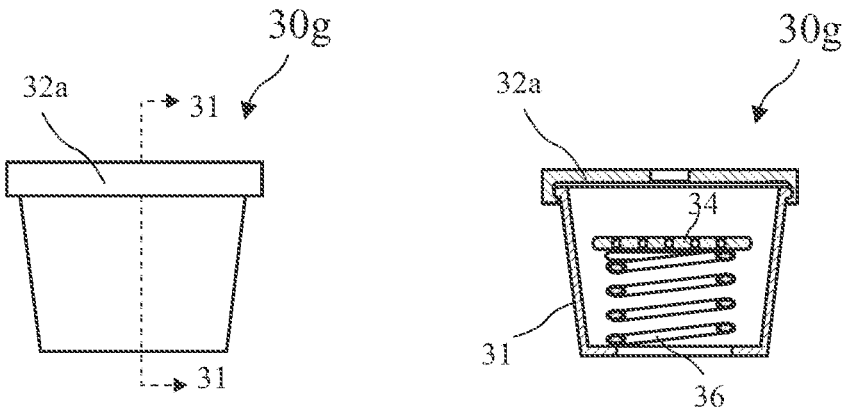
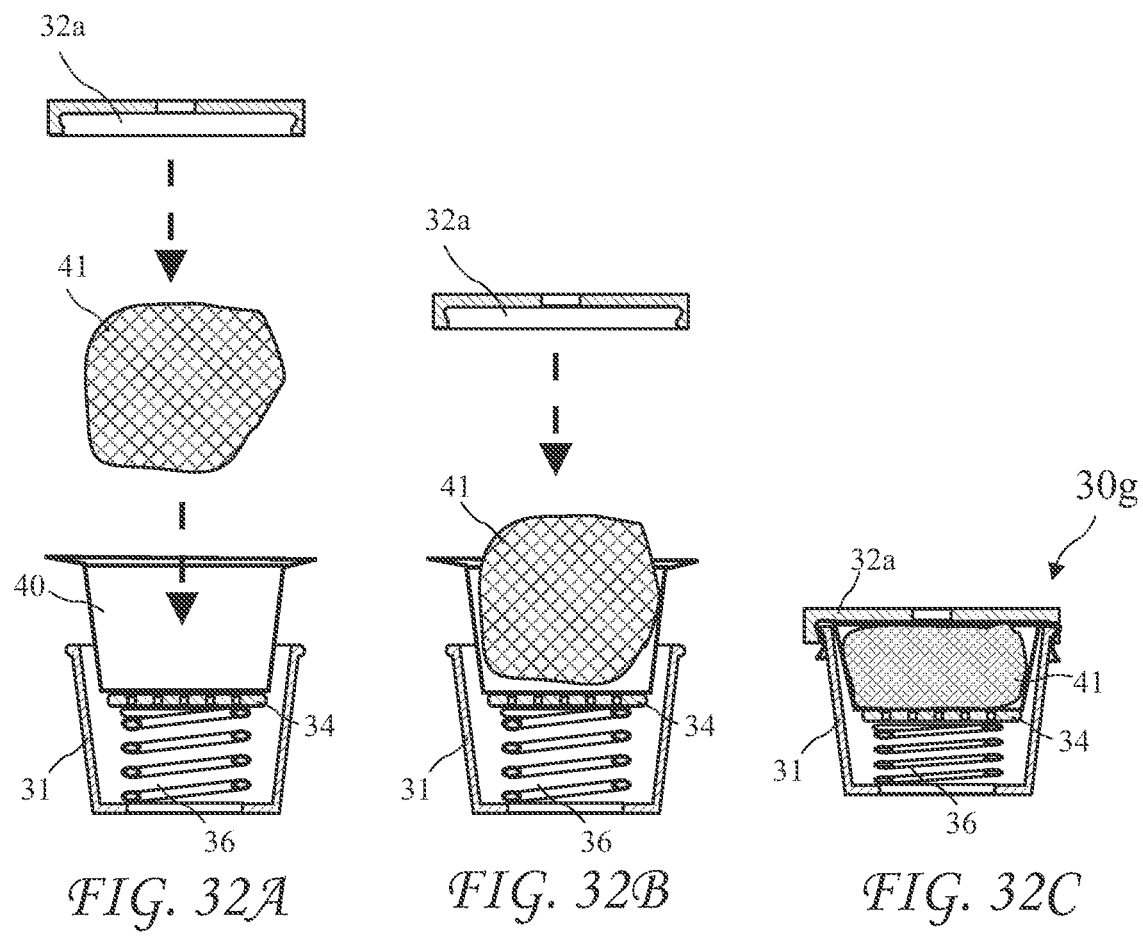
FIG. 30  FIG. 31
FIG. 32A  FIG. 32B  FIG. 32C

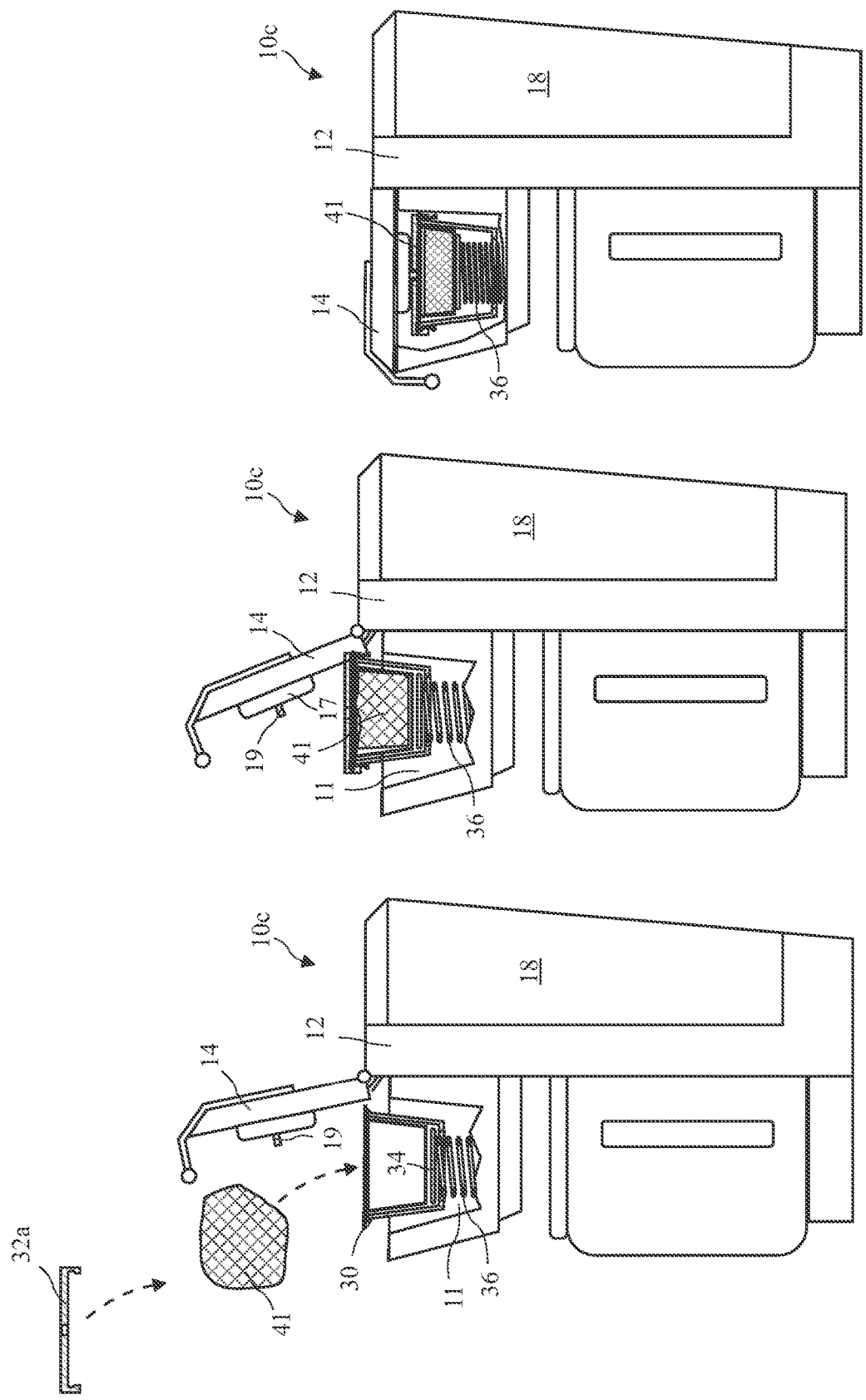

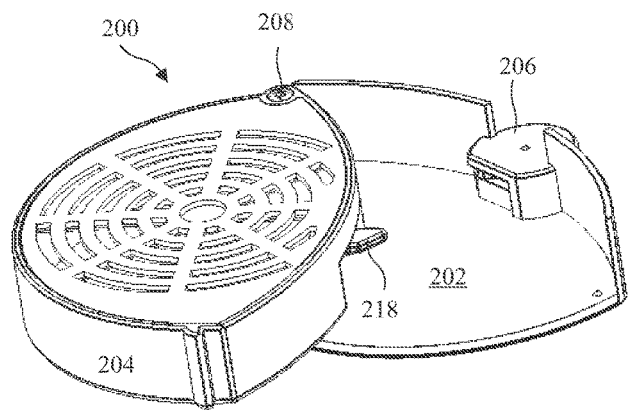
FIG. 70A
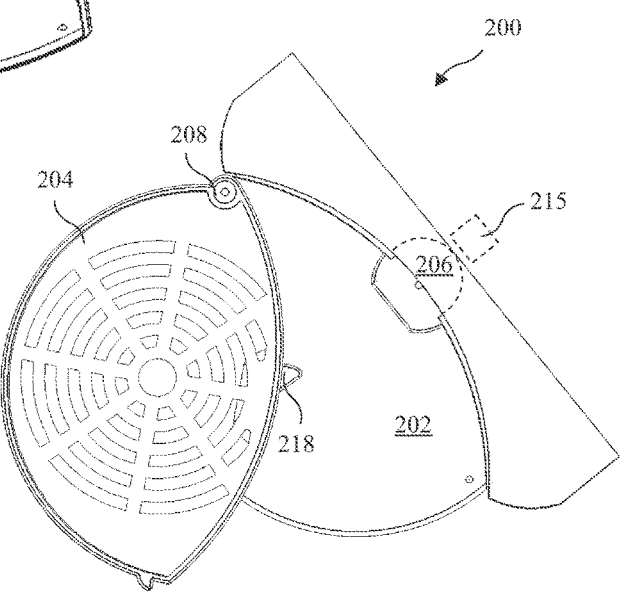
FIG. 70B
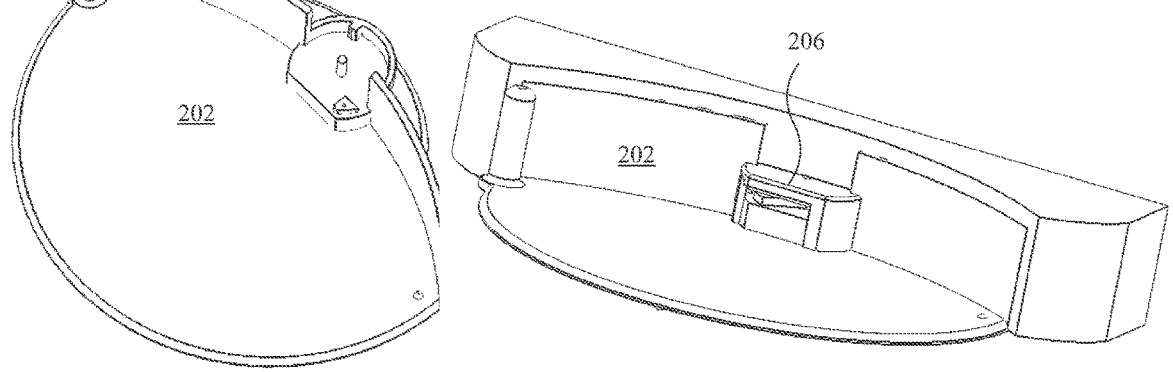
FIG. 71A
FIG. 71B

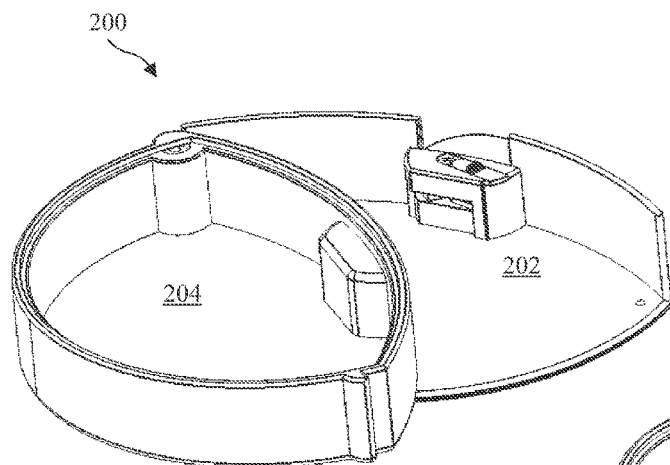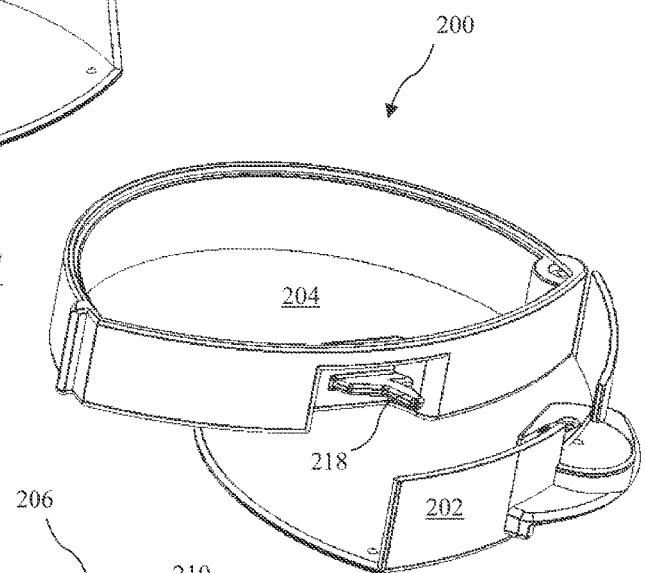

BEVERAGE BREWER WITH MULTI- AND SINGLE-CUP MODES

CROSS-REFERENCE TO RELATED APPLICATIONS

This is a continuation-in-part of U.S. patent application Ser. No. 15/046,757, which was filed on Feb. 18, 2016, which in turn was a continuation-in-part of U.S. patent application Ser. No. 12/610,181, which was filed on Oct. 30, 2009, and U.S. patent application Ser. No. 12/620,584, which was filed on Nov. 17, 2009, and U.S. patent application Ser. No. 12/762,262, which was filed Apr. 16, 2010, the disclosures of all of which are incorporated herein in their entireties.

FIELD OF THE INVENTION

The present invention relates to beverage brewers and in particular to a beverage brewer utilizing a stream of hot water through tamped ground brewing material.

BACKGROUND OF THE INVENTION

A brewed beverage is generally prepared in a beverage brewer by measuring an amount of ground brewing material into a beverage filter and providing a stream of hot water through the loosely-packed ground brewing material. Unfortunately, water passes freely through the loosely-packed ground brewing material and does not provide the full potential flavor to the brewed beverage.

This situation has been addressed by using pre-packaged brewing material packed in closed filter paper commonly called a pod, which is inserted into a pod holder including a tamping spring and bottom tamper for tamping the pod between the bottom tamper and a brewing material holder lid. Such a system does not allow the use of bulk ground brewing material not pre-packaged in the closed pod.

It is also known to provide a tamped packing of loose ground brewing material for a brewing system. Brewing material grounds are first loosely deposited in a brewing material holder and then tamped onto a compacted state. The brewing material holder can be filled loosely with the brewing material which is then placed into the beverage making apparatus and compacted, or the brewing material can be compacted in the brewing material holder and then the brewing material holder placed into the beverage making apparatus. The compacting can be effectuated by a spring or by a resilient solid material and can be part of the brewing material holder or part of the beverage making apparatus.

A self-tamping brewing material holder is known which tamps loose ground beverage in a brewing material holder. An internal filter chamber holds the brewing material and allows tamping of the brewing material into a compacted state.

Known beverage brewers generally prepare either several cups of beverage to fill a carafe, or only a single cup. Most consumers do not have space for multiple beverage brewers and therefore must choose between a multi-cup brewer and a single-cup brewer. It would therefore be advantageous to provide a beverage brewer with tamping capability that can brew a beverage from ground brewing material of a user's choosing in a desired amount, selectable between two or more different output quantities of brewed beverage.

BRIEF SUMMARY OF THE INVENTION

According to an aspect of the invention, a multi-mode beverage brewer includes a body, a brewing chamber in the body configured to receive beverage brewing material, a flow controller in the body, a selector, and a tray. The flow controller is configured to control a flow of water to the brewing chamber such that in a first mode a first quantity of water or in a second mode a second quantity of water is provided to the brew chamber. The selector is configured to actuate the first mode or the second mode of the flow controller. The tray is configured to support a brewed beverage container to receive a brewed beverage from the brewing chamber. The selector is configured as a magnet and a magnetic sensing element. One each of the magnet and the magnetic sensing element is arranged in the body and in the tray.

The flow controller can include an electrically-controlled valve and/or an electrically-controlled pump.

The body can include a passage, and the magnetic sensing element can be disposed in the body at a sensing distance to the passage. The tray can include a probe carrying the magnetic element. The probe can be configured to enter the passage such that the magnetic sensing element senses the magnetic element to actuate the first mode or the second mode of the flow controller.

The beverage brewer can also include a brewed beverage container support, configured to be coupled with the tray to position the probe within the passage to actuate the first mode or the second mode of the flow controller.

The beverage brewer can also include first and second brewed beverage container supports, configured to be coupled with the tray to position the probe within the passage to actuate the respective first mode or second mode of the flow controller.

BRIEF DESCRIPTION OF THE SEVERAL VIEWS OF THE DRAWING

FIG. 1A is a front view of an exemplary beverage brewer according to the present invention.

FIG. 1B is a side view of an exemplary beverage brewer according to the present invention.

FIG. 1C is a top view of an exemplary beverage brewer according to the present invention.

FIG. 2 is a side view of an exemplary beverage brewer with an open lid allowing placement of a brewing material holder inside the beverage brewer according to the present invention.

FIG. 8A shows an exemplary brewing material holder ready for insertion into the beverage brewer.

FIG. 8B shows an exemplary brewing material holder inserted into the beverage brewer before tamping the beverage.

FIG. 8C shows an exemplary brewing material holder inserted into the beverage brewer after tamping the beverage.

FIG. 18A shows an exemplary brewing material holder ready for insertion into an exemplary beverage brewer according to the present invention.

FIG. 18B shows an exemplary brewing material holder inserted into the beverage brewer before tamping the beverage.

FIG. 18C shows an exemplary brewing material holder inserted into the beverage brewer after tamping the beverage.

FIG. 19 is a side view of an exemplary brewing material holder according to the present invention.

FIG. 20 is a cross-sectional side view of an exemplary brewing material holder according to the present invention taken along line 20-20 of FIG. 19.

FIG. 21A is a cross-sectional side view of an exemplary brewing material holder according to the present invention taken along line 20-20 of FIG. 19 showing the brewing material holder with the bottom tamper, a portion of beverage, and the holder lid ready to attach, according to the present invention.

FIG. 21B is a cross-sectional side view of an exemplary brewing material holder according to the present invention taken along line 20-20 of FIG. 19 showing the brewing material holder with the bottom tamper, a portion of beverage in the brewing material holder, and the holder lid ready to attach, according to the present invention.

FIG. 21C is a cross-sectional side view of an exemplary brewing material holder according to the present invention taken along line 20-20 of FIG. 19 showing the brewing material holder with the bottom tamper, a portion of beverage in the brewing material holder, and the holder lid attached, according to the present invention.

FIG. 24 is a side view of an exemplary brewing material holder according to the present invention.

FIG. 25 is a cross-sectional side view of an exemplary brewing material holder according to the present invention taken along line 25-25 of FIG. 24.

FIG. 26A is a cross-sectional side view of an exemplary brewing material holder according to the present invention taken along line 25-25 of FIG. 24 showing the portion of beverage above the brewing material holder body, and the holder lid with the top tamper and tamping spring, ready to attach to the brewing material holder body, according to the present invention.

FIG. 26B is a cross-sectional side view of an exemplary brewing material holder according to the present invention taken along line 25-25 of FIG. 24 showing the brewing material holder with the portion of beverage in the brewing material holder, and the holder lid with the top tamper and tamping spring ready to attach to the brewing material holder body, according to the present invention.

FIG. 26C is a cross-sectional side view of an exemplary brewing material holder according to the present invention taken along line 25-25 of FIG. 24 showing the portion of beverage in the brewing material holder, and the holder lid with the top tamper and tamping spring attached to the holder body, according to the present invention.

FIG. 30 is a side view of an exemplary brewing material holder according to the present invention.

FIG. 31 is a cross-sectional side view of an exemplary brewing material holder according to the present invention taken along line 31-31 of FIG. 30.

FIG. 32A is a cross-sectional side view of an exemplary brewing material holder according to the present invention taken along line 31-31 of FIG. 30 showing the portion of beverage above the brewing material holder, and the holder lid ready to attach to the holder body, according to the present invention.

FIG. 32B is a cross-sectional side view of an exemplary brewing material holder according to the present invention taken along line 31-31 of FIG. 30 showing the portion of beverage in the brewing material holder, and the holder lid ready to attach to the holder body, according to the present invention.

FIG. 32C is a cross-sectional side view of an exemplary brewing material holder according to the present invention taken along line 31-31 of FIG. 30 showing the portion of beverage in the brewing material holder, and the holder lid attached to the holder body and the beverage tamped between the bottom tamper and spring and the holder lid, according to the present invention.

FIG. 37A shows an exemplary beverage brewer having a brewing material holder for receiving a portion of beverage and tamping spring according to the present invention for tamping the beverage when the beverage brewer lid is closed.

FIG. 37B shows an exemplary beverage brewer with the brewing material holder holding the portion of beverage and the tamping spring under the brewing material holder according to the present invention for tamping the beverage when the beverage brewer lid is closed.

FIG. 37C shows an exemplary beverage brewer with the brewing material holder holding the portion of tamped brewing material with the beverage brewer lid closed for tamping the beverage according to the present invention.

FIG. 64 is a side view of an exemplary multimode beverage brewer according to the present invention.

FIG. 65A is a front, view of an exemplary multimode beverage brewer according to the present invention with a carafe positioned for receiving a volume of beverage.

FIG. 65B is a side view of an exemplary multimode beverage brewer according to the present invention with the carafe positioned for receiving a volume of beverage.

FIG. 66A is a front view of an exemplary multimode beverage brewer according to the present invention with a beverage cup positioned for receiving a volume of beverage.

FIG. 66B is a side view of an exemplary multimode beverage brewer according to the present invention with the beverage cup positioned for receiving a volume of beverage.

FIG. 67A is a front view of an exemplary single-cup adapter according to the present invention.

FIG. 67B is a side view of an exemplary single-cup adapter according to the present invention.

FIG. 67C is a top view of an exemplary single-cup adapter according to the present invention.

FIG. 68 is a cross-sectional view of an exemplary single-cup adapter according to the present invention taken along line 68-68 of FIG. 67A.

FIG. 69A is a side view of an exemplary multi-serving brewing material holder, according to the present invention.

FIG. 69B is a side view of an exemplary single-serving brewing material holder, according to the present invention.

FIG. 70A is a perspective view of an exemplary beverage brewer mug tray according to the present invention.

FIG. 70B is a top view of an exemplary beverage brewer mug tray according to the present invention.

FIG. 71A is a top perspective view of an exemplary mug tray base according to the present invention.

FIG. 71B is a front perspective view of an exemplary mug tray base according to the present invention.

FIG. 72A is a perspective view of an exemplary beverage brewer mug tray, with a grill removed, according to the present invention.

FIG. 72B is a second perspective view of an exemplary beverage brewer mug tray, with the grill removed, according to the present invention.

FIG. 73A shows a perspective top view of an exemplary actuating assembly of the beverage brewer mug tray according to the present invention.

FIG. 73B shows a bottom view of an exemplary actuating assembly of the beverage brewer mug tray according to the present invention.

FIG. 74A shows a perspective top view of actuator elements of an exemplary actuating assembly of the beverage brewer mug tray according to the present invention.

FIG. 74B shows a bottom view of the actuator elements of an exemplary actuating assembly of the beverage brewer mug tray according to the present invention.

Figures 75A, 75B:
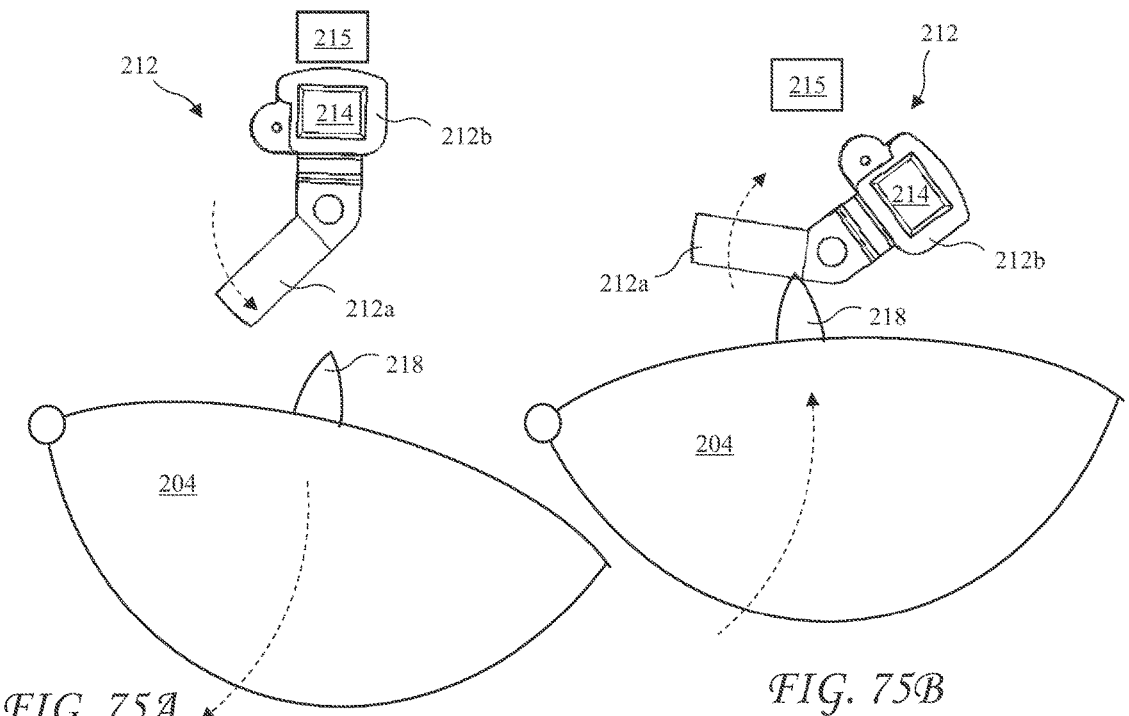

FIG. 75A show a top view of an exemplary pivoting actuator cooperating with a sensing element of the beverage brewer according to the present invention.

FIG. 75A show a top view of an exemplary drip tray of the beverage brewer mug tray pivoted away from the beverage brewer and the pivoting actuator cooperating with a sensing element of the beverage brewer according to the present invention.

FIG. 75B show a top view of an exemplary drip tray of the beverage brewer mug tray pivoted into the beverage brewer and the pivoting actuator pivoted away from the sensing element of the beverage brewer according to the present invention.

Figures 76A, 76B:
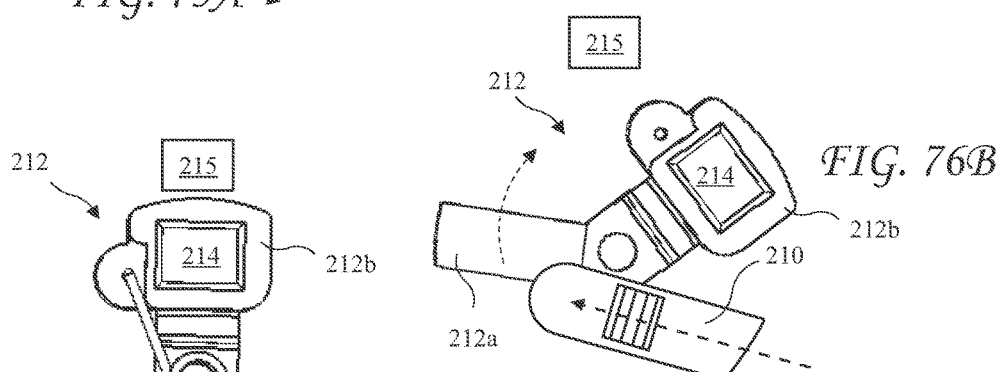

FIG. 76A show a top view of an exemplary slide of the actuating assembly disengaged from the pivoting actuator and the pivoting actuator cooperating with a sensing element of the beverage brewer according to the present invention.

FIG. 76B show a top view of an exemplary slide of the actuating assembly engaged with the pivoting actuator and the pivoting actuator pivoted away from the sensing element of the beverage brewer according to the present invention.

Figure 77:
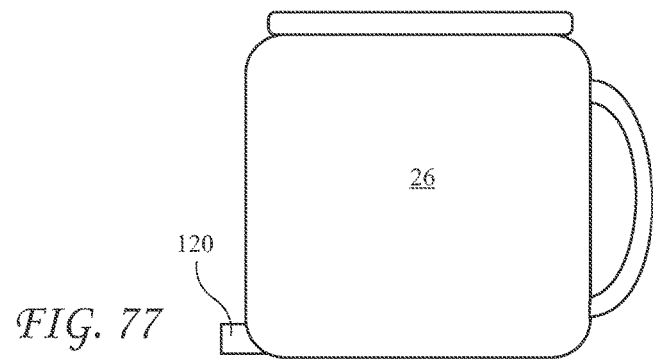

FIG. 77 shows an exemplary carafe having a finger for cooperating with the beverage brewer to change an operating mode according to the present invention.

Corresponding reference characters indicate corresponding components throughout the several views of the drawings.

DETAILED DESCRIPTION OF THE INVENTION

Referring to FIGS. 1A-1C, a beverage brewer 10 according to the invention includes a body 12, an opening lid 14, a lid handle 16, a water container 18, a display 20, controls 22, a platform 24, and a mouth 12a. A beverage pitcher 26 rests on the platform 24 inside the mouth 12a and has a pitcher lid 28. The beverage brewer 10 provides a flow of hot water through brewing material, such as coffee grounds, to produce a beverage, such as coffee. The flow of water can be heated by one of any known means, for example, an electrical heating coil or a conductive coating on tubing carrying the water.

Referring to FIG. 2, the open lid 14 allows placement of a brewing material holder 30 according to the present invention inside the beverage brewer 10. The lid 14 includes a lid hinge 14a and a water tube 15 carries heated water into the lid 14. A pad 17 is disposed on a bottom surface of the lid 14 and presses against the brewing material holder 30 when the lid 14 is closed, and in cooperation with other means to be described, tamps beverage brewing material contained in the brewing material holder 30. A nozzle 19 extending down from the closed lid 14 directs the flow of hot water into the brewing material holder 30.

A functional diagram of the beverage brewer 10 is shown in FIG. 2A. The preferred beverage brewer 10 includes the water tank 18, a water pump 21, a heater 13, a check valve 23, and the nozzle 18. The pump 21 provides, for example, at least one PSI water pressure. The water heater 13 can include a heating coil or a resistive coating or any other means for heating water. The check valve 23 limits the water pressure at the nozzle 19 by returning some of the water flow to the water tank 18. While the water pump 21 is a preferred method for providing a flow of water to the nozzle 19, other mechanisms can be used according to the invention. The water in the water tank 18, and a beverage brewer using any means to provide a forced flow of water is intended to be included within the scope of the present invention.

Figure 3:
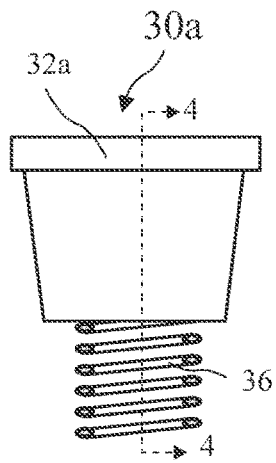
FIG. 3 is a side view of an exemplary brewing material holder according to the present invention.
Figure 4:
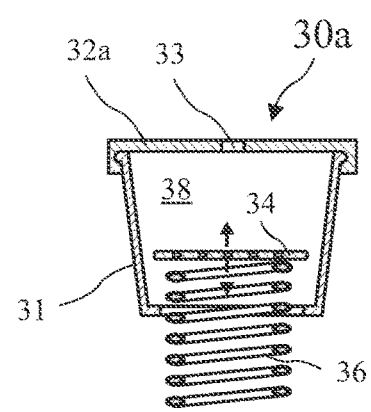
FIG. 4 is a cross-sectional side view of an exemplary brewing material holder according to the present invention taken along line 4-4 of FIG. 3.
Figure 5A:
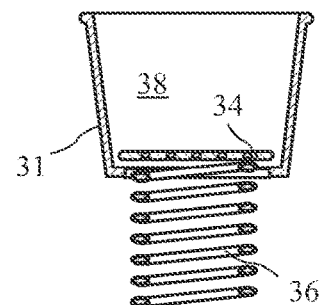
FIG. 5A is a cross-sectional side view of an exemplary brewing material holder according to the present invention taken along line 4-4 of FIG. 3 showing an empty brewing material holder with the tamping spring and the bottom tamper according to the present invention.
Figure 5B:
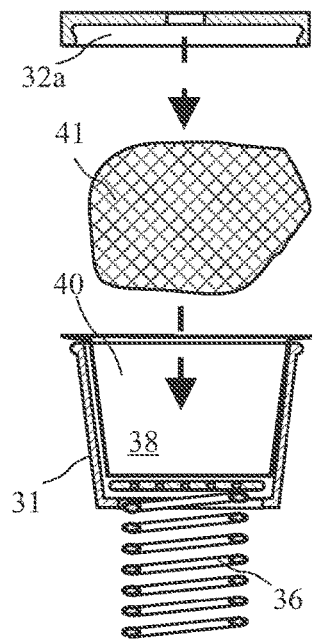
FIG. 5B is a cross-sectional side view of an exemplary brewing material holder according to the present invention taken along line 4-4 of FIG. 3 showing the brewing material holder with the tamping spring and bottom tamper, a portion of beverage, and the holder lid ready to attach to a holder body according to the present invention.
Figure 5C:
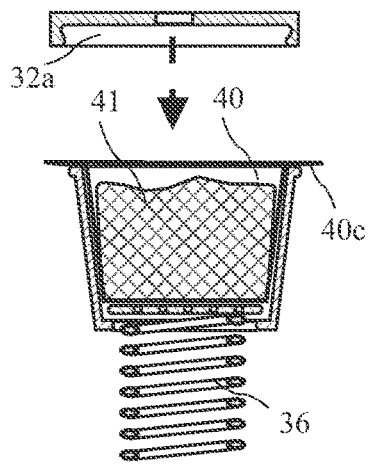
FIG. 5C is a cross-sectional side view of an exemplary brewing material holder according to the present invention taken along line 4-4 of FIG. 3 showing the brewing material holder with the tamping spring and bottom tamper, the portion of beverage in the brewing material holder, and the holder lid ready to attach to the holder body according to the present invention.
Figure 5D:
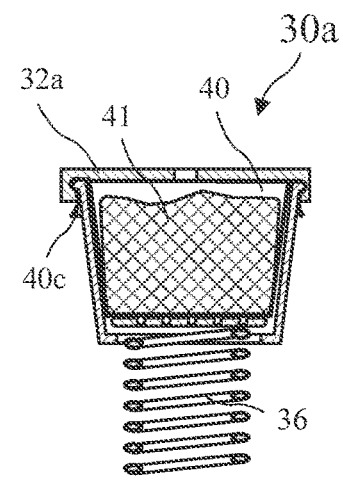
FIG. 5D is a cross-sectional side view of an exemplary brewing material holder according to the present invention taken along line 4-4 of FIG. 3 showing the brewing material holder with the tamping spring and bottom tamper, the portion of beverage in the brewing material holder, and the holder lid attached to the brewing material holder body, according to the present invention.

Referring to FIGS. 3 and 4, a volume (or brewing material holder interior) 38 is provided inside the brewing material holder 30a to receive loose brewing material 41. A passage 33 in the lid 32a is provided for the nozzle 19 (see FIG. 2).

Referring to FIGS. 5A-D, cross-sectional side views of the brewing material holder 30a taken along line 4-4 of FIG. 3 show an empty brewing material holder 30a with the tamping spring 36 and the bottom tamper 34 ready for filling; the brewing material holder 30a with the tamping spring 36 and bottom tamper 34, a portion of loose brewing material 41, and the holder lid 32a ready to attach; the brewing material holder 30a with the tamping spring 36 and bottom tamper 34, a portion of beverage in the volume 38, and the holder lid 32a ready to attach; and the brewing material holder 30a with the tamping spring 36 and bottom tamper 34, a portion of loose brewing material 41 in the volume 38, and the holder lid 32a attached to the brewing material holder 30a.

Figure 6:
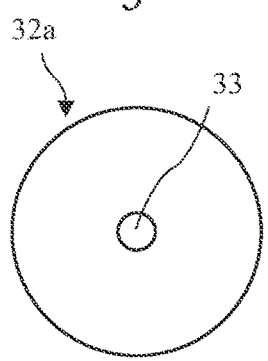
FIG. 6 is a top view of an exemplary holder lid.

FIG. 6 shows a top view of the holder lid 32a showing the passage 33 provided for the nozzle 19 (see FIG. 2).

Figure 7A:
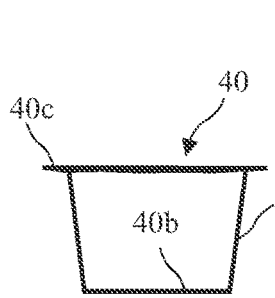
FIG. 7A is a side view of an exemplary filter paper cup according to the present invention.
Figure 7B:
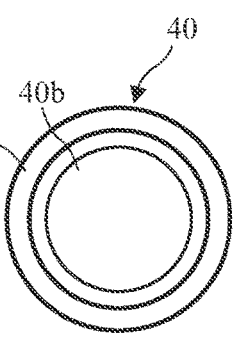
FIG. 7B is a top view of an exemplary filter paper cup according to the present invention.

Referring to FIGS. 7A and B, the filter paper cup 40 includes a bottom 40b, sides 40a, and a rim 40c. The rim 40c rests on a top edge of the holder body 31 and is held between the holder cap and body when the cap is placed on the body, so as to prevent or restrict the escape of brewing material 41 from the cup 40 when hot water flows into the brewing material holder 30a.

Alternatively, the filter paper cup 40' can have a folding paper lid 40d as shown in FIG. 70. The lid 40d of the filter paper cup 40' can be folded over the cup 40' after loose brewing material is poured into the cup. The lid 40d preferably includes a perforation 40e centered on the lid 40d allowing the nozzle 19 to enter and/or inject the hot flow of water into the tamped brewing material 41. The filter cups can be made from any of several materials, including filter paper, nylon mesh, steel mesh, or any material suitable for filtration.

Referring to FIGS. 8A-C, the beverage brewer can include a cavity (or brewing chamber) 11 for accepting the brewing material holder and has walls 11a for aligning the brewing material holder in the beverage brewer. When the lid 14 is closed, the pad 17 on the bottom of the lid 14 and/or arms 25 attached to the bottom of the lid 25 push the brewing material holder 30a down over the tamping spring 36 and the brewing material 41 is tamped between the lid 32a and the bottom tamper 34. The arms 25 push the brewing material holder 30a down ahead of the nozzle 19 so as to seat the brewing material holder 30a in the cavity 11 for alignment of the nozzle 10 with the passage 33 in the lid 32a.

Figure 9:
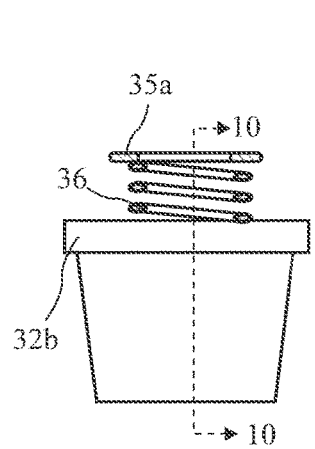
FIG. 9 is a side view of an exemplary brewing material holder according to the present invention.
Figure 10:
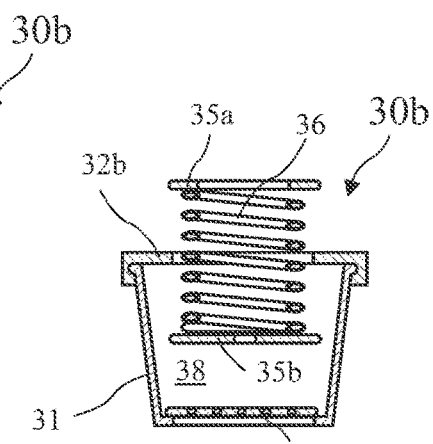
FIG. 10 is a cross-sectional side view of an exemplary brewing material holder according to the present invention taken along line 10-10 of FIG. 9.
Figure 11A:
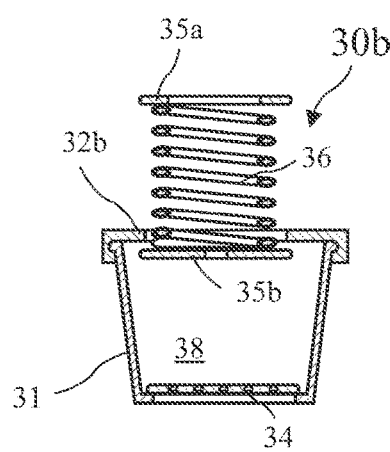
FIG. 11A is across-sectional side view of an exemplary brewing material holder according to the present invention taken along line 10-10 of FIG. 9 showing an empty brewing material holder with the tamping spring and the top tamper according to the present invention.
Figure 11B:
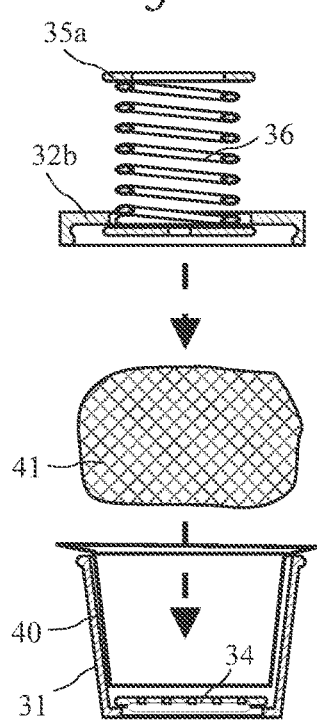
FIG. 11B is a cross-sectional side view of an exemplary brewing material holder according to the present invention taken along line 10-10 of FIG. 9 showing the brewing material holder with the holder lid, tamping spring and top tamper, and a portion of beverage, ready to attach according to the present invention.
Figure 11C:
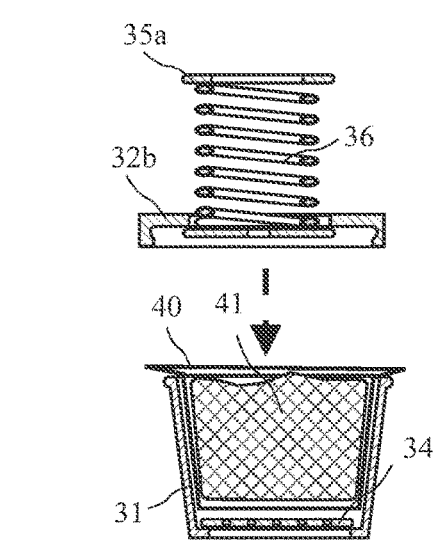
FIG. 11C is a cross-sectional side view of an exemplary brewing material holder according to the present invention taken along line 10-10 of FIG. 9 showing the portion of untamped brewing material in the brewing material holder, and the holder lid, tamping spring and top tamper, ready to attach to the holder base, according to the present invention.
Figure 11D:
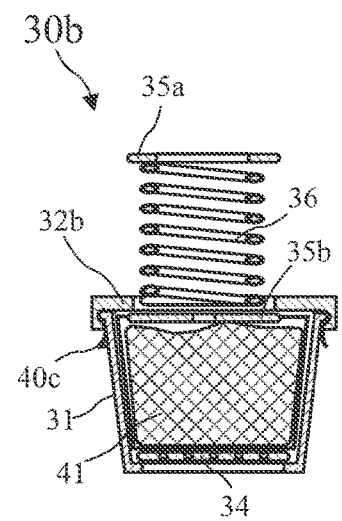
FIG. 11D is a cross-sectional side view of an exemplary brewing material holder according to the present invention taken along line 10-10 of FIG. 9 showing the portion of beverage in the brewing material holder and the tamping spring, top tamper, and the holder lid attached to the brewing material holder, according to the present invention.

Referring to FIGS. 9 and 10, the brewing material holder 30b can include the holder body 31, a holder lid 32b, a tamping spring 36, a spring washer 35a, and a top tamper 35b.

Referring to FIGS. 11A-D, cross-sectional side views of the brewing material holder 30b taken along line 10-10 of FIG. 9 show an empty brewing material holder 30b; the holder lid 32b and a loose portion of brewing material 41 above the empty brewing material holder 30b; the holder lid 32b above the brewing material holder 30b with the portion of loose brewing material 41 in the brewing material holder 32b; and the brewing material holder with the holder lid 32b attached to the brewing material holder 30b and a portion of loose brewing material 41 in the brewing material holder 30b. The tamping spring 36 extends upward out of the brewing material holder 30b for tamping the loose brewing material, which will be described in more detail.

Figure 12:
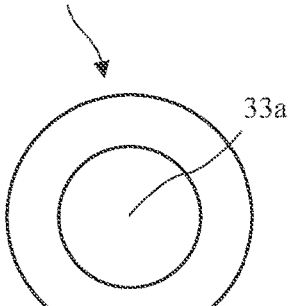
FIG. 12 is a top view of an exemplary holder lid.

Referring to FIG. 12, the holder lid 32b includes a larger passage 33a allowing passage of the tamping spring 36 through the holder lid 32b.

Figure 13:
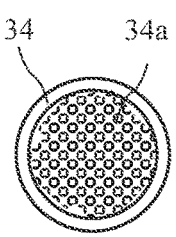
FIG. 13 is a top view of an exemplary bottom tamper.

Referring to FIG. 13, the bottom tamper 34 includes perforations 34a to allow beverage drink to pass through the bottom tamper 34.

Figure 14C:
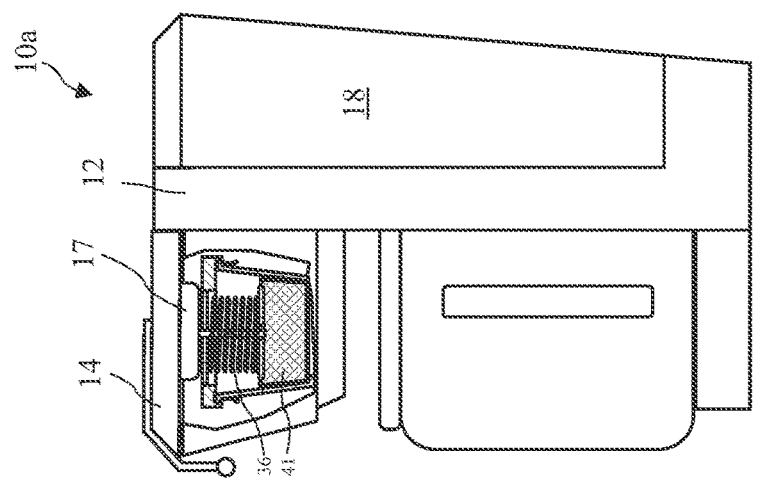
FIG. 14C shows an exemplary brewing material holder inserted into the beverage brewer after tamping the beverage.
Figure 14B:
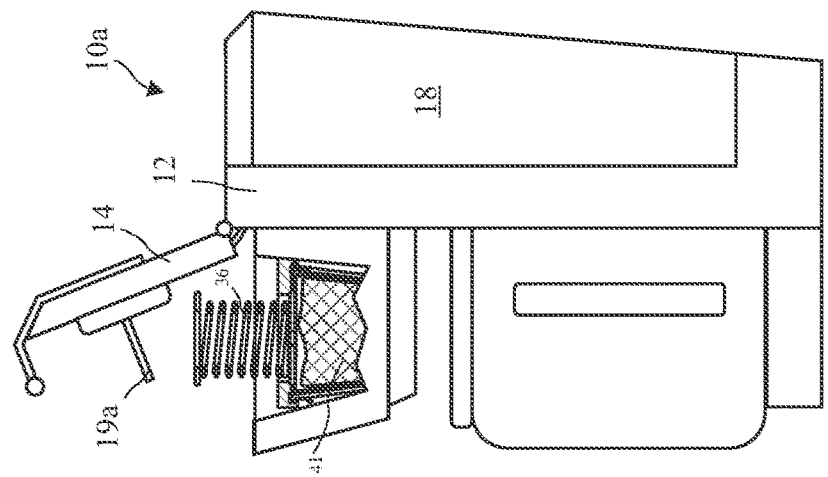
FIG. 14B shows an exemplary brewing material holder inserted into the beverage brewer before tamping the beverage.
Figure 14A:
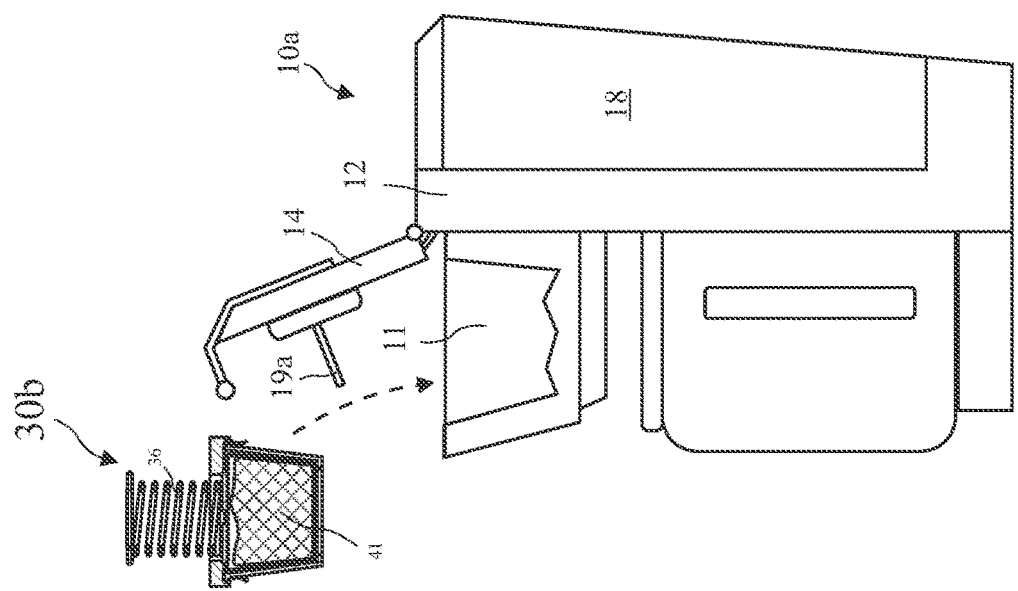
FIG. 14A shows an exemplary brewing material holder ready for insertion into the beverage brewer.

FIGS. 14A-C show the brewing material holder 30b ready for insertion into the beverage brewer 10, inserted into the beverage brewer 10 before tamping the brewing material 41, and in the beverage brewer 10 after tamping the brewing material 41. The beverage brewer 10 can include a long nozzle 19a to reach the top tamper 35b for "injection" of the heated water into the tamped brewing material, or can otherwise include the nozzle 19 and the heated water can pass through the brewing material 41 under the pull of gravity.

Figure 15:
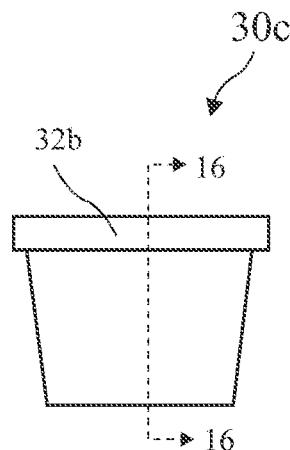
FIG. 15 is a side view of an exemplary brewing material holder according to the present invention.
Figure 16:
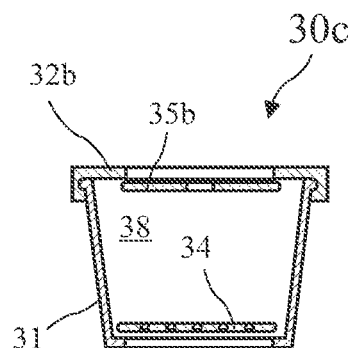
FIG. 16 is a cross-sectional side view of an exemplary brewing material holder according to the present invention taken along line 16-16 of FIG. 15.

Referring to FIGS. 15 and 16, the brewing material holder 30c includes the holder body 31, the holder lid 32b, the bottom tamper 34, and the top tamper 35b.

Figure 17A:
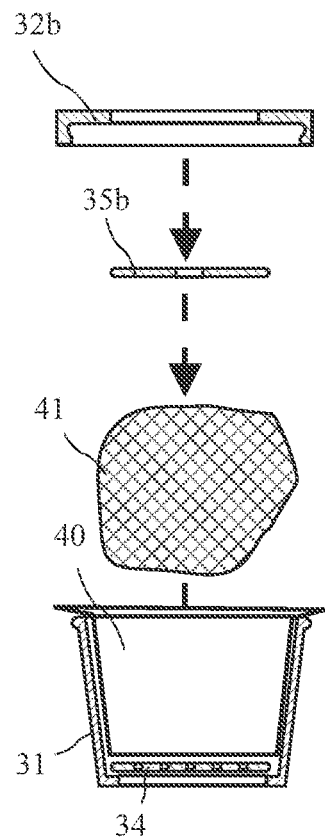
FIG. 17A is a cross-sectional side view of an exemplary brewing material holder according to the present invention taken along line 16-16 of FIG. 15 showing the portion of beverage above the brewing material holder and the top tamper and the holder lid ready to attach to the brewing material holder, according to the present invention.
Figure 17B:
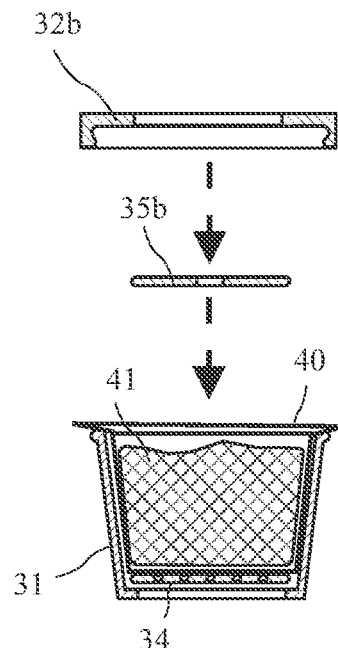
FIG. 17B is a cross-sectional side view of an exemplary brewing material holder according to the present invention taken along line 16-16 of FIG. 15 showing the portion of beverage in the brewing material holder, and the top tamper and the holder lid ready to attach to the brewing material holder, according to the present invention.
Figure 17C:
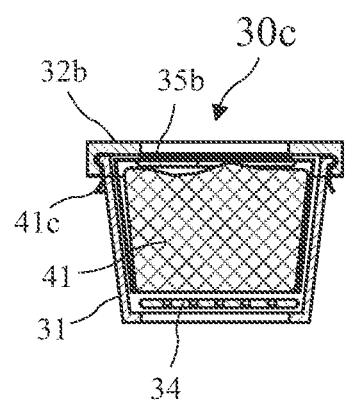
FIG. 17C is a cross-sectional side view of an exemplary brewing material holder according to the present invention taken along line 16-16 of FIG. 15 showing the portion of beverage in the brewing material holder, and the bottom tamper, the top tamper, and the holder lid attached to the brewing material holder, according to the present invention.

Referring to FIGS. 17A-C, cross-sectional side views of the an exemplary brewing material holder 30c taken along line 16-16 of FIG. 15 show the brewing material holder 30c with the holder lid 32b, the top tamper 35b, and a portion of beverage, ready to attach to the holder 31; the brewing material holder 30c with the holder lid 32b and the top tamper ready to attach, and a portion of brewing material 41 in the brewing material holder; and the brewing material holder with the holder lid and the top tamper attached and a loose portion of brewing material 41 in the brewing material holder. The brewing material holder 30c is configured to use with a beverage brewer 10b (see FIGS. 18A-18C) including apparatus for entering the brewing material holder for tamping the loose brewing material 41.

FIGS. 18A-C show the brewing material holder 30c ready for insertion into a beverage brewer 10b, the brewing material holder 30c disposed in the beverage brewer 10b before tamping the brewing material 41, and the brewing material holder 30c disposed in the beverage brewer 10b after tamping the brewing material 41. The beverage brewer 10b as shown includes the tamping spring 36 attached to the pad 17 on the bottom of the lid 14. When the lid 14 is closed the tamping spring 36, enters the brewing material holder 30c through the lid passage 33a (see FIG. 12) and pushes the top tamper 35b against the brewing material 41 to tamp the brewing material 41.

Referring to a side view of an exemplary brewing material holder 30d according to the is present invention in FIG. 19 and a cross-sectional side view of the brewing material holder 30d taken along line 20-20 of FIG. 19 in FIG. 20, the brewing material holder 30d includes the holder body 31, the holder lid 32a, and the bottom tamper 34.

FIGS. 21A-C are cross-sectional side views of the brewing material holder 30d taken along line 20-20 of FIG. 19 showing the brewing material holder with the bottom tamper 34, and a portion of brewing material 41 and the holder lid ready to attach; the brewing material holder 30d with the bottom tamper 34, the portion of brewing material 41 in the brewing material holder 30d, and the holder lid 32a ready to attach; and the brewing material holder 30d with the bottom tamper 34, a portion of beverage in the brewing material holder 41, and the holder lid 32a.

Figure 22C:
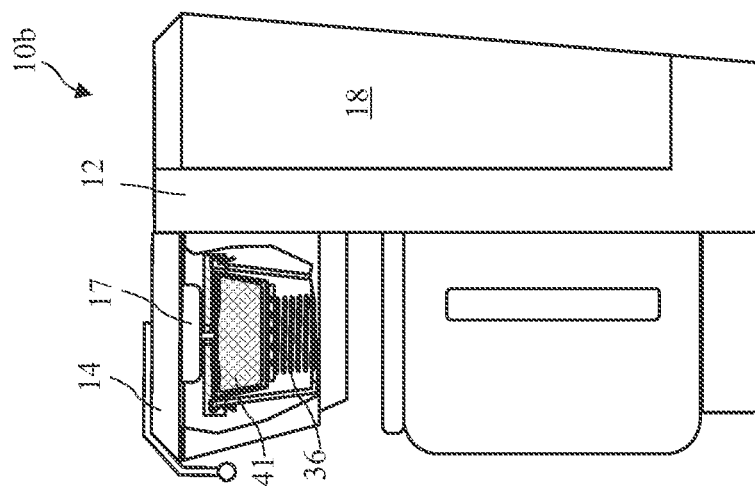
FIG. 22C shows an exemplary brewing material holder inserted into the beverage brewer after tamping the beverage.
Figure 22B:
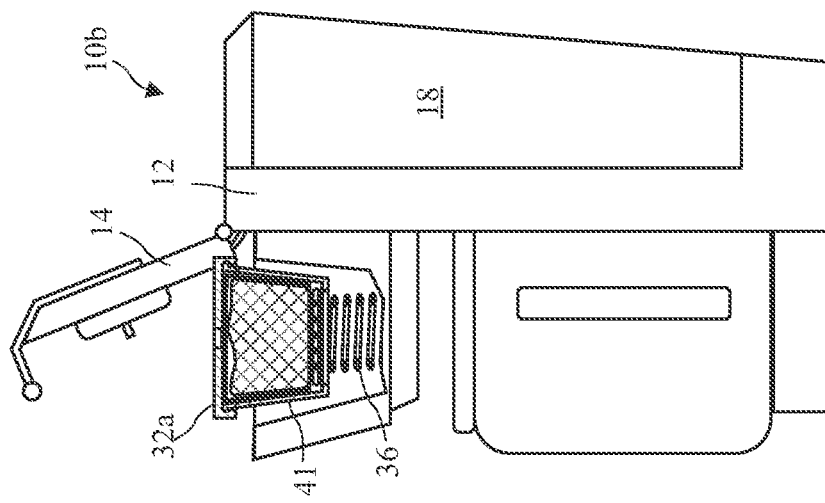
FIG. 22B shows an exemplary brewing material holder inserted into the beverage brewer before tamping the beverage.
Figure 22A:
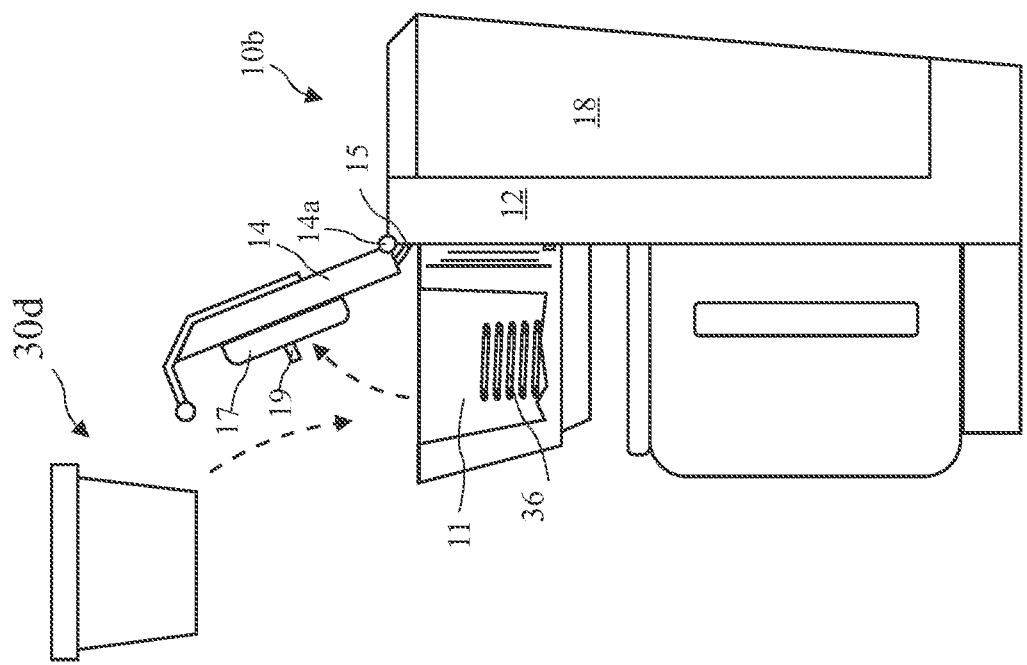
FIG. 22A shows an exemplary brewing material holder ready for insertion into the beverage brewer.

FIGS. 22A-C show the brewing material holder 30d ready for insertion into another embodiment of the beverage brewer 10b, the brewing material holder 30d disposed in the beverage brewer 10b before tamping the brewing material 41, and the brewing material holder 30d disposed in the beverage brewer 10b after tamping the brewing material 41. The beverage brewer 10b can include the tamping spring 36 arranged in the bottom of the brewing material holder cavity 11. When the lid 14 is closed, the pad 17 pushed the brewing material holder 30d down over the tamping spring 36 and the tamping spring 36 enters the brewing material holder 30c through the bottom of the holder body 31 and pushes the bottom tamper 34 against the brewing material 41 to tamp the brewing material 41.

Figure 23C:
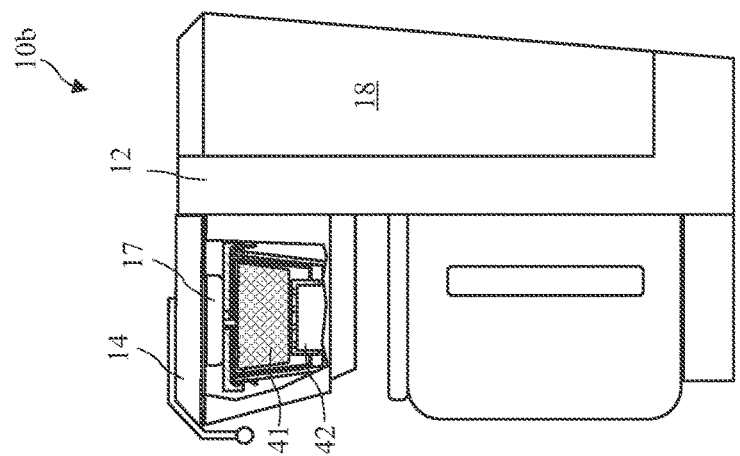
FIG. 23C shows an exemplary brewing material holder inserted into the beverage brewer having the tamping block after tamping the beverage.
Figure 23B:
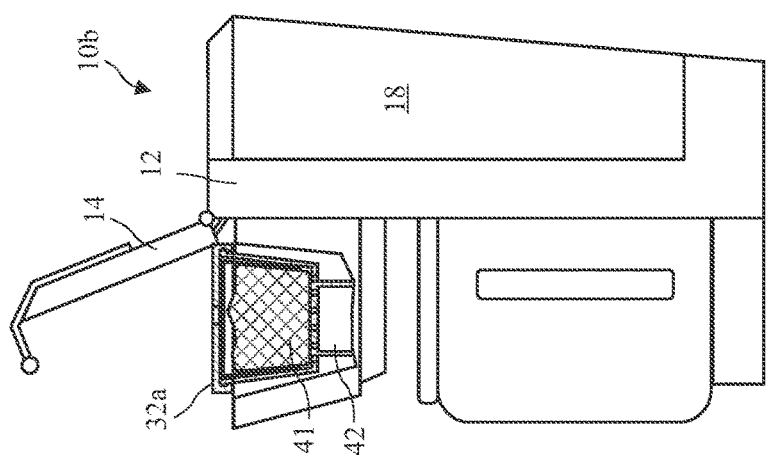
FIG. 23B shows an exemplary brewing material holder inserted into the beverage brewer having the tamping block before tamping the beverage.
Figure 23A:
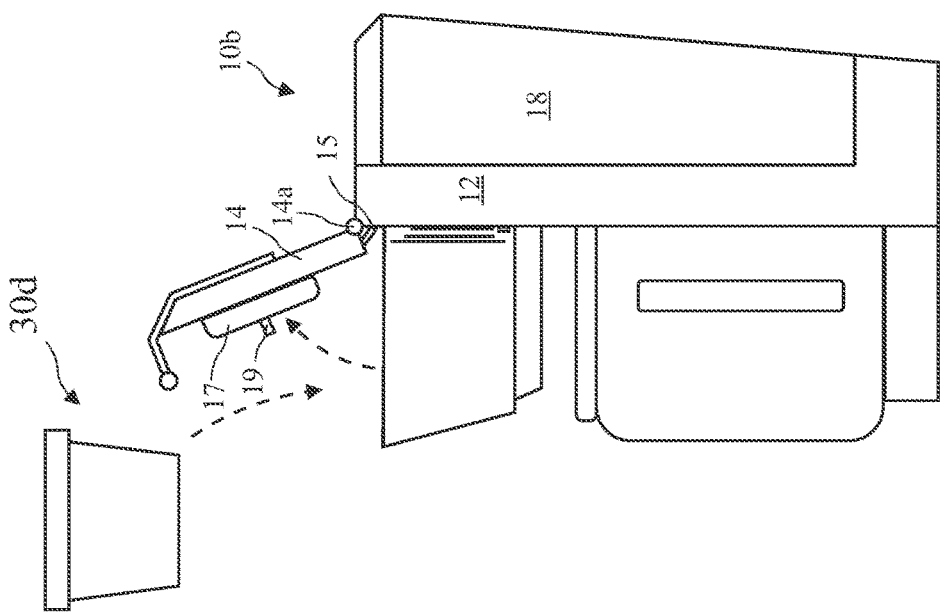
FIG. 23A shows an exemplary brewing material holder ready for insertion into the beverage brewer having a tamping block according to the present invention.

FIGS. 23A-C show the brewing material holder 30d ready for insertion into another embodiment of the beverage brewer 10b, the brewing material holder 30d disposed in the beverage brewer 10b before tamping the brewing material 41, and the brewing material holder 30d disposed in the beverage brewer 10b after tamping the brewing material 41. The beverage brewer 10b can include a resilient solid block 42 arranged in the bottom of the brewing material holder cavity 11. When the lid 14 is closed, the pad 17 pushes the brewing material holder 30d down over the resilient solid block 42 and the resilient solid block 42 enters the brewing material holder 30c through the bottom of the holder body 31 and pushes the bottom tamper 34 against the brewing material 41 to tamp the brewing material 41.

A side view of a brewing material holder 30e according to the present invention is shown in FIG. 24 and a cross-sectional side view of the brewing material holder 30e taken along line 25-25 of FIG. 24 is shown in FIG. 25. The brewing material holder 30e includes the holder body 31, the holder lid 32b, the tamping spring 36 and the top tamper 35b attached to the holder lid 32a.

A cross-sectional side view of the brewing material holder 30e taken along line 25-25 of FIG. 24 showing the brewing material holder 30e with a portion of brewing material 41, and the holder lid 32b with the top tamper 35b and tamping spring 36 attached, above the holder body 31, is shown in FIG. 26A. A cross-sectional side view of the brewing material holder 30e taken along line 25-25 of FIG. 24 showing the brewing material holder with the portion of brewing material 41 in the brewing material holder, and the holder lid 32b with the top tamper 35b and tamping spring 36 attached, above the holder body 31, is shown in FIG. 26B. A cross-sectional side view of the brewing material holder 30e taken along line 25-25 of FIG. 24 showing the brewing material holder 30e with the portion of brewing material 41 in the brewing material holder 30e, and the holder lid 32b with the top tamper 35b and tamping spring 36 attached to the holder base 31 is shown in FIG. 26D. The tamping spring 36 and top tamper 35b tamp the brewing material 41 to provide a tamped brewing material when the holder lid 32b is attached to the holder base 31.

Figure 27:
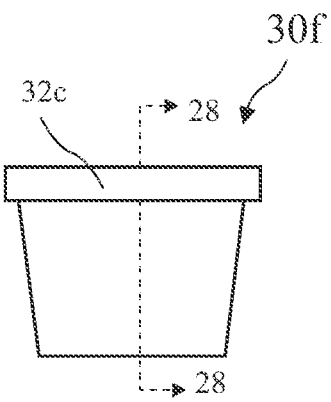
FIG. 27 is a side view of an exemplary brewing material holder according to the present invention.
Figure 28:
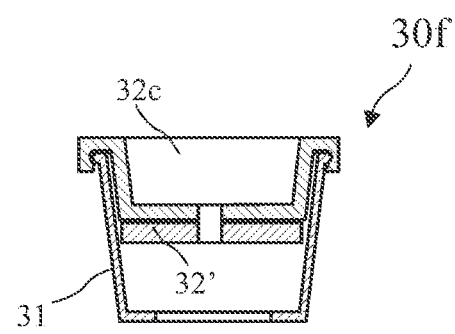
FIG. 28 is a cross-sectional side view of an exemplary brewing material holder according to the present invention taken along line 28-28 of FIG. 27.

A side view of a brewing material holder 30f according to the present invention is shown in FIG. 27 and a cross-sectional side view of the brewing material holder 30f taken along line 28-28 of FIG. 27 is shown in FIG. 28. The brewing material holder 30f includes the holder body 31 and a holder lid 32c. The holder lid 32c includes a recessed portion 32' that reaches into the interior of the brewing material holder 30f. The recessed portion 32' is preferably a solid resilient material.

Figure 29A:
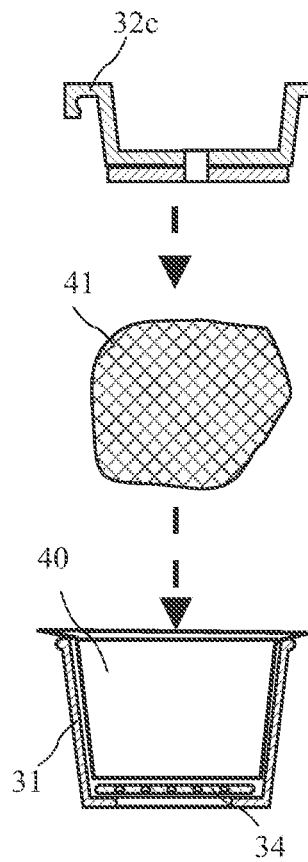
FIG. 29A is a cross-sectional side view of an exemplary brewing material holder according to the present invention taken along line 28-28 of FIG. 27 showing the portion of beverage above the brewing material holder, and the holder lid ready to attach to the holder body, according to the present invention.
Figure 29B:
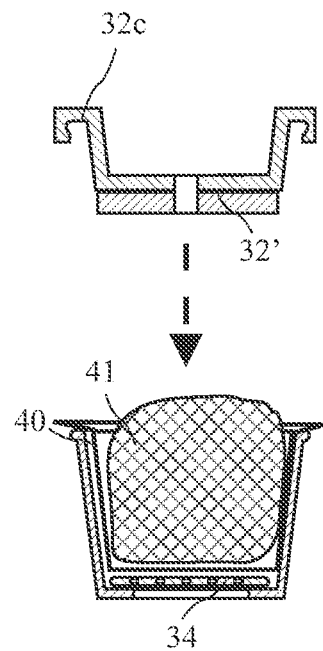
FIG. 29B is a cross-sectional side view of an exemplary brewing material holder according to the present invention taken along line 28-28 of FIG. 27 showing the portion of beverage in the brewing material holder, and the holder lid ready to attach to the holder body, according to the present invention.
Figure 29C:
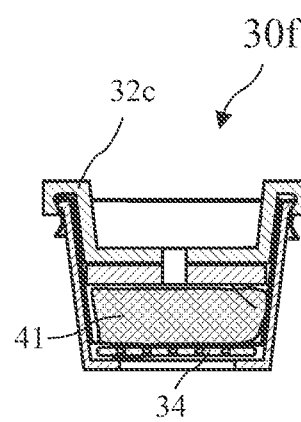
FIG. 29C is a cross-sectional side view of an exemplary brewing material holder according to the present invention taken along line 28-28 of FIG. 27 showing the portion of beverage in the brewing material holder, and the holder lid attached and tamping the beverage, according to the present invention.

A cross-sectional side view of the brewing material holder 30f taken along line 28-28 of is FIG. 27 showing the brewing material holder 30f with a portion of brewing material 41, and the holder lid 32c, above the holder body 31, is shown in FIG. 29A. A cross-sectional side view of the brewing material holder 30f taken along line 28-28 of FIG. 27 showing the brewing material holder with the portion of brewing material 41 in the brewing, material holder, and the holder lid 32c above the holder body 31, is shown in FIG. 29B. A cross-sectional side view of the brewing material holder 30f along line 28-28 of FIG. 27 showing the brewing material holder 30f with the portion of brewing material 41 in the brewing material holder 30e, and the holder lid 32e attached to the holder base 31, is shown in FIG. 26D. A cushion 32' tamps the brewing material 41 to provide a tamped brewing material when the holder lid 32e is attached to the holder base 31. The cushion 32' is preferably made from a resilient material to cushion the tamping of the loose brewing material.

A side view of a brewing material holder 30g according to the present invention is shown in FIG. 30 and a cross-sectional side view of the brewing material holder 30g taken along line 31-31 of FIG. 30 is shown in FIG. 31. The brewing material holder 30g includes the holder body 31, the holder lid 32b, the tamping spring 36, and the bottom tamper 34 inside the holder base 31.

A cross-sectional side view of the brewing material holder 30g taken along line 31-31 of FIG. 30 showing the brewing material holder 30g with a portion of brewing material 41 and the holder lid 32a above the holder body 31, and with the bottom tamper 34 and tamping spring 36 inside the holder base 31, is shown in FIG. 26A. A cross-sectional side view of the brewing material holder 30g taken along line 31-31 of FIG. 30 showing the brewing material holder with the portion of brewing material 41 in the filter paper 40 in the holder base 31 resting on the bottom tamper 34 supported by the tamping spring 36, and the holder lid 32a above the holder body 31, is shown in FIG. 26B. A cross-sectional side view of the brewing material holder 30g taken along line 31-31 of FIG. 30 showing the brewing material holder 30g with the portion of brewing material 41 in the brewing material holder 30e, and the holder lid 32a attached to the holder base 31, is shown in FIG. 26D. The tamping spring 36 and bottom tamper 34 tamp the brewing material 41 upward against the tamper lid 32a to provide a tamped brewing material when the holder lid 32a is attached to the holder base 31.

Figures 33, 34A, 34B:
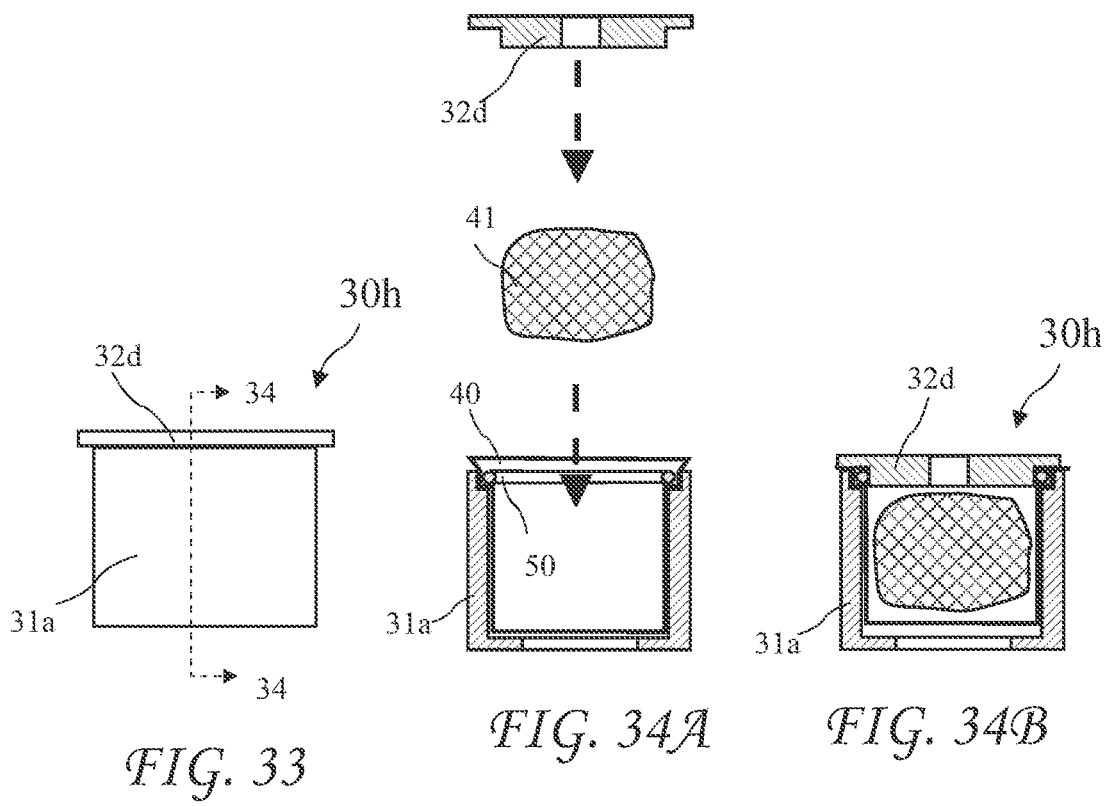
FIG. 33 is a side view of an exemplary brewing material holder according to the present invention.
FIG. 34A is a cross-sectional side view of an exemplary brewing material holder taken along line 34-34 of FIG. 33 showing a portion of beverage for placing inside the brewing material holder and the holder lid with an insertable portion and an O-Ring inside the brewing material holder for sealing according to the present invention.
FIG. 34B is across-sectional side view of an exemplary brewing material holder taken along line 34-34 of FIG. 33 showing the portion of beverage inside the brewing material holder and the holder lid with the insertable portion inserted into the brewing material holder and cooperating with the O-Ring inside the brewing material holder for sealing.

A side view of a brewing material holder 30h according to the present invention is shown in FIG. 33, a cross-sectional side view of the brewing material holder 30h taken along line 34-34 of FIG. 33 showing a portion of brewing material 41 for placing inside the brewing material holder and a holder lid 32d with an insertable portion and an O-Ring 50 inside the brewing material holder for sealing is shown in 34A, and a cross-sectional side view of the brewing material holder taken along line 34-34 of FIG. 33 showing the portion of brewing material 41 inside the brewing material holder 30h and the holder lid 32d with the insertable portion inserted into the brewing material holder base 31*a* is shown in FIG. 34B. The filter paper 40 extends up above the O-ring 50 and the O-Ring 50 cooperates with the holder lid 32*d* to sandwich the top edge of the filter paper 40 for sealing the filter paper 40 to reduce or prevent the brewing material 41 from escaping when the flow of hot water is provided to the brewing material holder 30*h*. The holder base 31*a* is preferably cylindrical but can instead be conical in shape.

Figures 35, 36A, 36B:
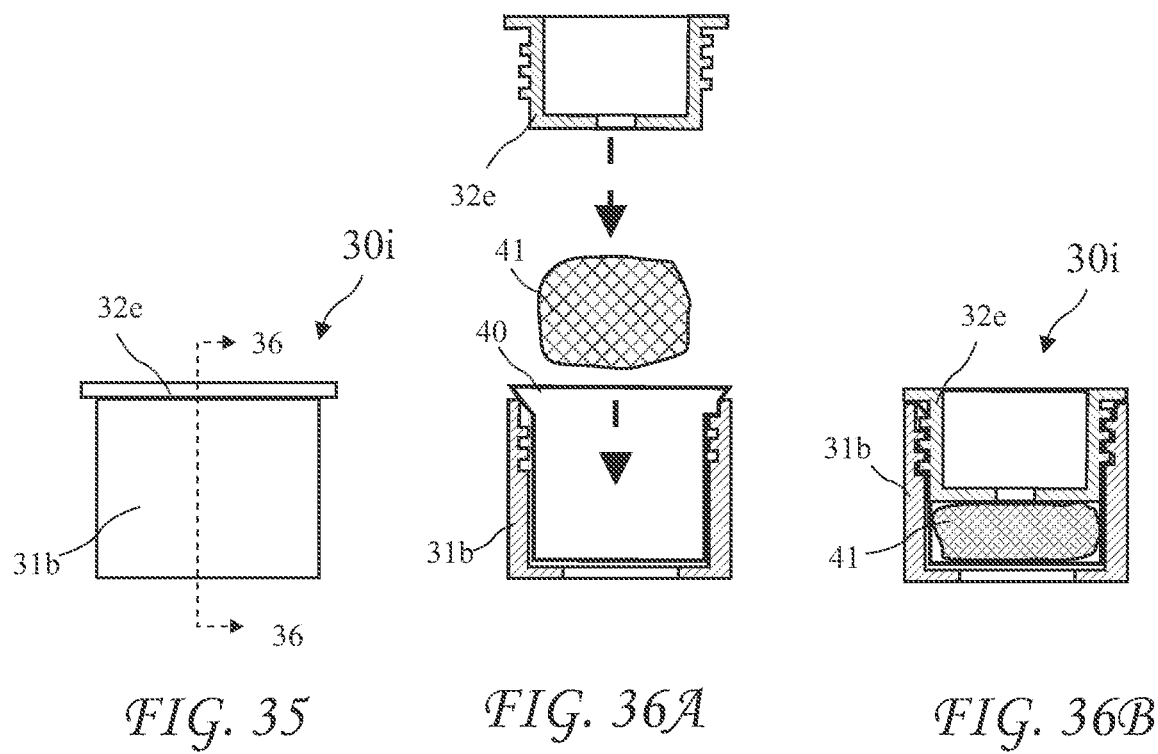
FIG. 35 is a side view of an exemplary brewing material holder according to the present invention.
FIG. 36A is a cross-sectional side view of an exemplary brewing material holder taken along line 36-36 of FIG. 35 showing a portion of beverage for placing inside the brewing material holder and a holder lid with a threaded portion for screwing inside the holder body for sealing according to the present invention.
FIG. 36B is a cross-sectional side view of an exemplary brewing material holder taken along line 36-36 of FIG. 35 showing the portion of beverage inside the brewing material holder and a holder lid with the threaded portion screwed into the holder body and tamping the beverage according to the present invention.

A side view of a brewing material holder 30*i* according to the present invention is shown in FIG. 35, a cross-sectional side view of the brewing material holder 30*i* taken along line 36-36 of FIG. 35 showing a portion of brewing material 41 for placing inside the brewing material holder and a holder lid 32*e* with a threaded portion for screwing inside the holder base 31*b* for sealing is shown in FIG. 36A, and a cross-sectional side view of the brewing material holder 30*i* taken along line 36-36 of FIG. 35 showing the portion of brewing material 41 inside the brewing material holder and the holder lid 32*e* with the threaded portion screwed into the brewing material holder and tamping the brewing material 41 is shown in FIG. 36B. The threads both provide tamping and sealing the beverage to reduce or prevent the brewing material 41 from escaping when the flow of hot water is provided to the brewing material holder 30*h*. The holder base 31*b* is preferably cylindrical to facilitate having internal threads, and at least the threaded portion is preferably cylindrical.

A beverage brewer 10*c* having a brewing material holder 30 according to the present invention for receiving a portion of beverage and a tamping spring 36 for tamping the beverage is shown in FIG. 37A, the beverage brewer 10*c* with the brewing material holder 30 holding the portion of brewing material 41 is shown in FIG. 378, and the beverage brewer 10*c* with the brewing material holder 30 holding the portion of brewing material 41 with the beverage brewer lid 14 closed for tamping the brewing material 41 is shown in FIG. 37C. When the lid 14 is closed, the pad 17 pushes the brewing material holder 30 down and the tamping spring 36 enters the bottom of the brewing material holder 30 to tamp the brewing material 41. While attaching the lid 32*a* to the holder 30 is preferred in order to prevent beverage grounds from escaping the holder 30, the beverage brewer 10*c* can also be used without the lid 32*a* and the pad 17 can serve to seal the brewing material 41 in the holder 30. In this instance, the beverage brewer lid 14 serves as a brewing material holder lid.

Figure 38C:
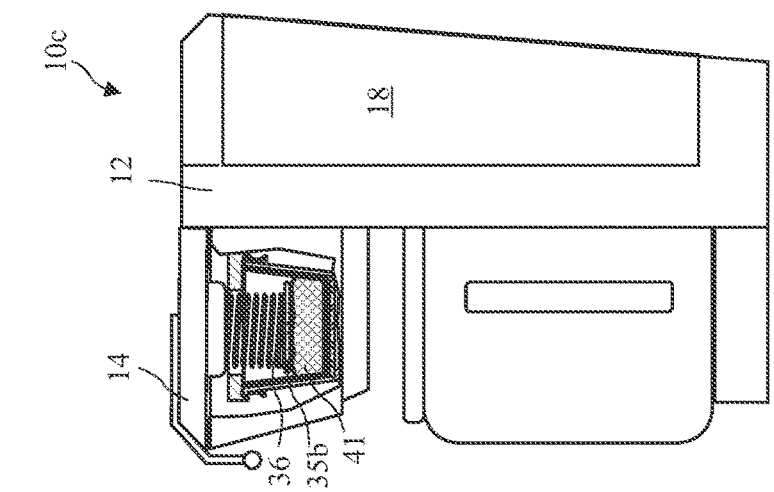
FIG. 38C shows an exemplary beverage brewer with the brewing material holder holding the portion of tamped brewing material with the beverage brewer lid closed to push the tamping spring into the brewing material holder for tamping the beverage according to the present invention.
Figure 38B:
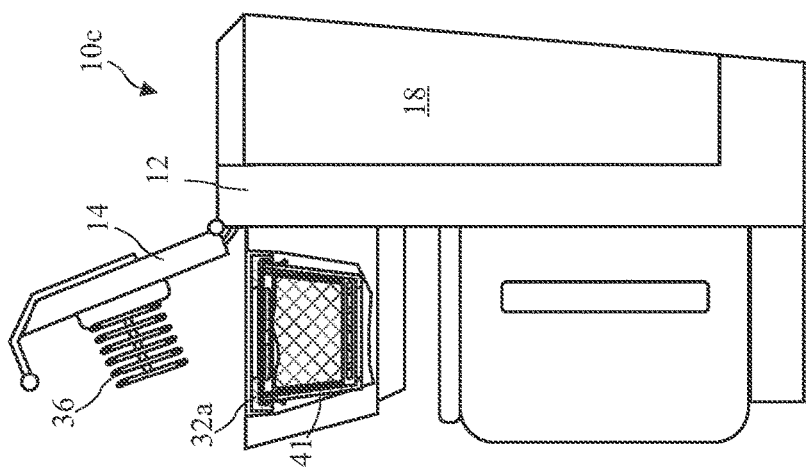
FIG. 38B shows an exemplary beverage brewer with the brewing material holder holding the portion of untamped brewing material according to the present invention for tamping the beverage when the beverage brewer lid is closed.
Figure 38A:
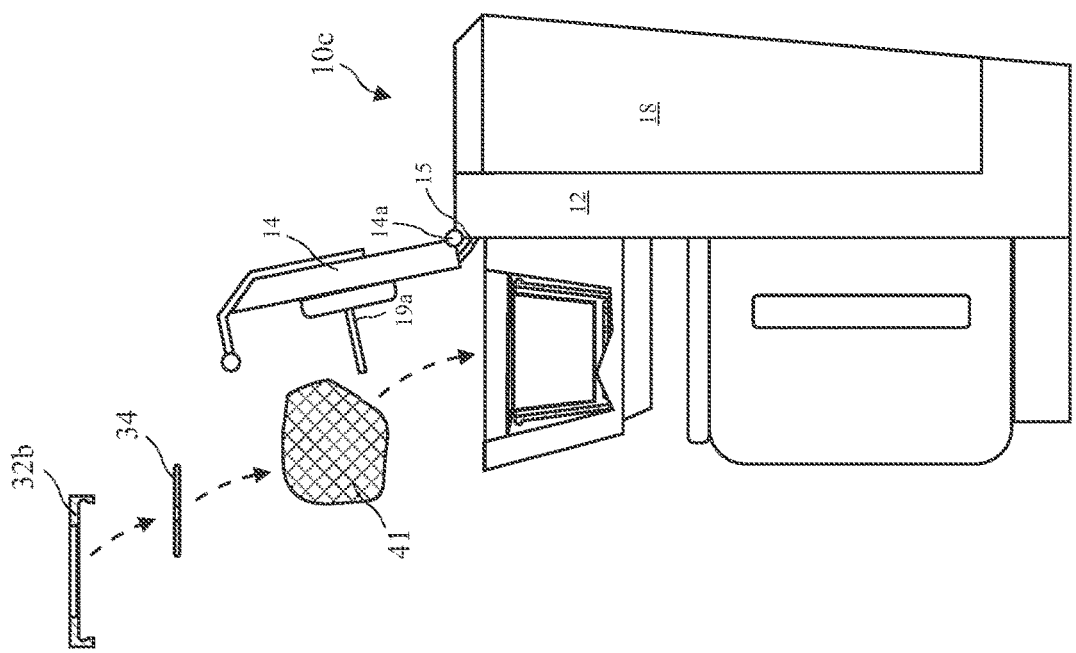
FIG. 38A shows an exemplary beverage brewer having a brewing material holder for receiving a portion of beverage and tamping spring attached to the beverage brewer lid according to the present invention for tamping the beverage when the beverage brewer lid is closed.

A beverage brewer 10*c* having a brewing material holder for receiving a portion of beverage and tamping spring 36 attached to the beverage brewer lid 14 according to the present invention for tamping the brewing material 41 when the beverage brewer lid 14 is closed is shown in FIG. 38A, the beverage brewer with the brewing material holder 30 holding the portion of brewing material 41 is shown in FIG. 38B, and the beverage brewer 10*c* with the brewing material holder 30 holding the portion of brewing material 41 with the beverage brewer lid 14 closed to push the tamping spring 36 into the brewing material holder 30 for tamping the brewing material 41 is shown in FIG. 38C.

Figure 39C:
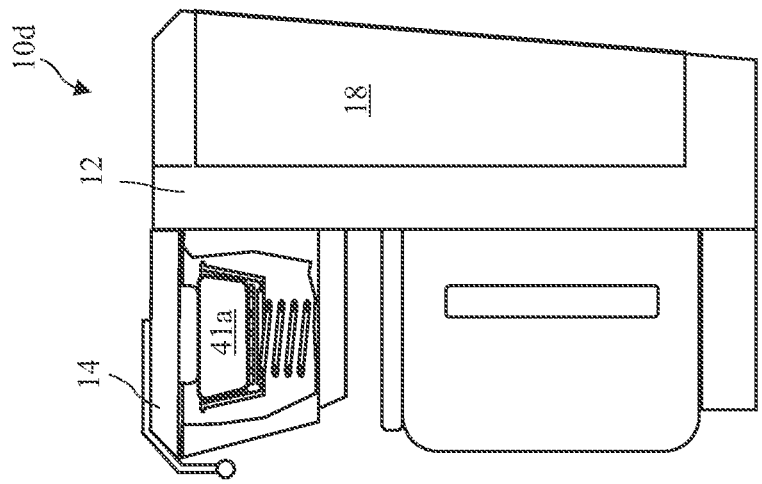
FIG. 39C shows an exemplary beverage brewer with the brewing material holder holding the packet of tamped brewing material with the beverage brewer lid closed to push the tamping spring into the brewing material holder for tamping the beverage according to the present invention.
Figure 39B:
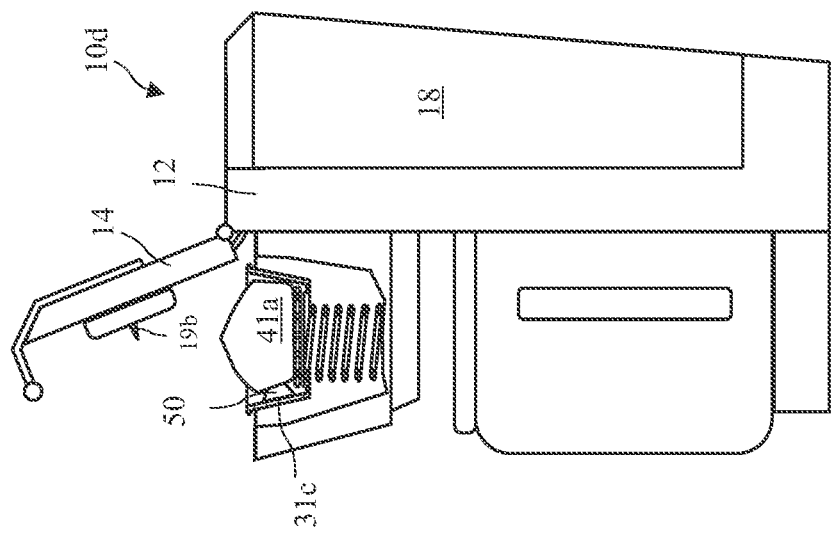
FIG. 39B shows an exemplary beverage brewer with the brewing material holder holding the packet of untamped brewing material according to the present invention for tamping the beverage when the beverage brewer lid is closed.
Figure 39A:
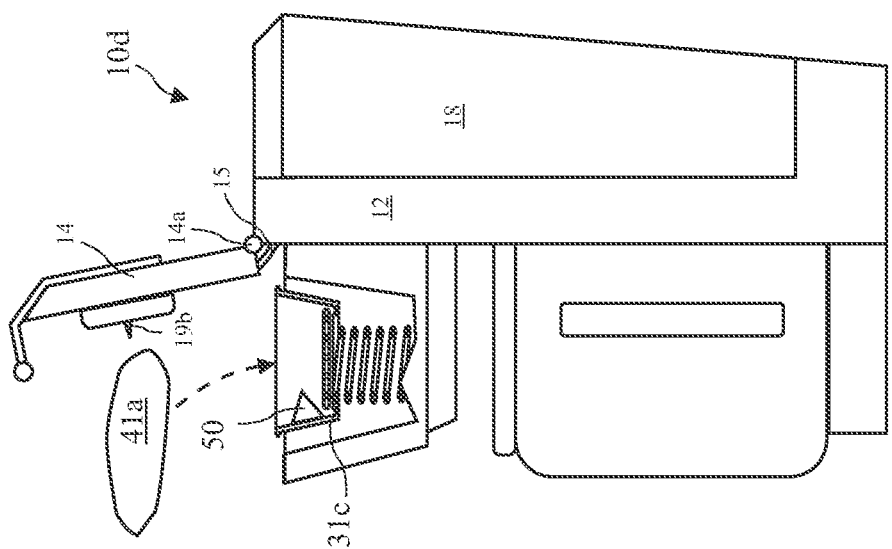
FIG. 39A shows an exemplary beverage brewer having a brewing material holder for receiving a packet containing untamped brewing material, a knife for cutting the packet open, and tamping spring attached to the beverage brewer lid according to the present invention for tamping the beverage when the beverage brewer lid is closed.

A beverage brewer 10*d* having a holder base 31*c* for receiving a packet 41*a* containing untamped brewing material, a knife 50 for cutting the packet 41*a* open, and tamping spring 36 under the holder base 31*c* according to the present invention for tamping the beverage when the beverage brewer lid is closed is shown in FIG. 39A, the beverage brewer 10*d* with the holder base 31*c* holding the packet 41*a* of untamped brewing material is shown in FIG. 39B, and the beverage brewer with the holder base 31*c* holding the packet of tamped brewing material 41*c* with the beverage brewer lid 14 closed to push the holder base down over the tamping spring 36 for tamping the beverage is shown in FIG. 39C. The beverage brewer 10*d* includes a somewhat pointed nozzle 19*a* to puncture the packet 41*a* to provide the flow of hot water to the tamped brewing material in the packet 41*a*. Known beverage packets include internal filters to allow a flow of hot water through the packet to make the beverage drink while preventing beverage grounds from escaping. The cut in the packet 41*a* made by the knife 50 allows the brewed beverage to escape from the packet while filter material in the packet 41*a* prevents beverage grounds from escaping. The tamping spring 36 can also be attached to the lid 14 as shown in FIGS. 38A-38C.

The packet 41*a* can be an air-tight pod containing beverage in filter paper and positioning the knife on the side of the holder base 31*c* results in less likelihood of the knife 50 cutting the filter paper. The packet 41*a* is preferably air-tight to maintain beverage freshness and can be plastic, metal foil, or other air-tight material that is sufficiently flexible to allow the beverage contained in the packet 41*a* to be tamped. Alternatively, the knife 50 can be eliminated when the packet 41*a* is configured to burst under pressure to expose the beverage, for example, when the beverage brewer tamps the beverage, the packet 41*a* also bursts. In one embodiment, filter paper 41 is inserted into the holder base 31*c* without the knife 50, and the packet 41*a* bursts during compacting to release the beverage into the filter paper.

Known beverage brewers use a sealed cup or capsule having a somewhat ridged cup with a foil cover. Such cups might be compressible and used in the beverage brewer 10*d*; however, a similar cup or capsule having a less ridged cup that can be compressed in the beverage brewer 10*d* are more suitable for use in the beverage brewer 10*d* to allow tamping of the beverage contained in the cup or capsule.

Figure 40C:
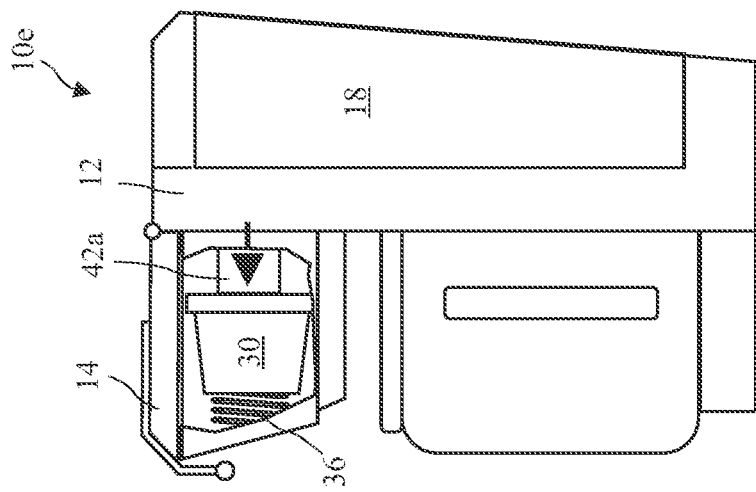
FIG. 40C shows an exemplary beverage brewer with the brewing material holder arranged horizontally in the brewing material holder cavity with the beverage brewer lid closed and the brewing material holder pushed against the tamping spring for tamping the beverage, according to the present invention.
Figure 40B:
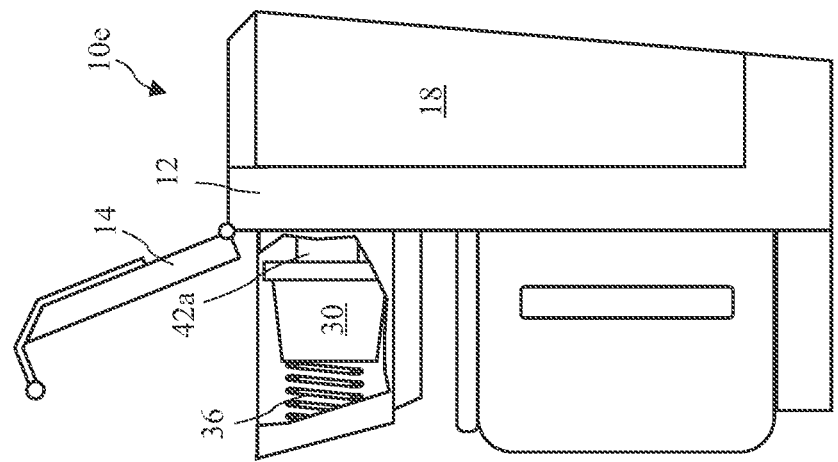
FIG. 40B shows an exemplary beverage brewer with the brewing material holder arranged horizontally in the brewing material holder cavity according to the present invention for tamping the beverage when the beverage brewer lid is closed.
Figure 40A:
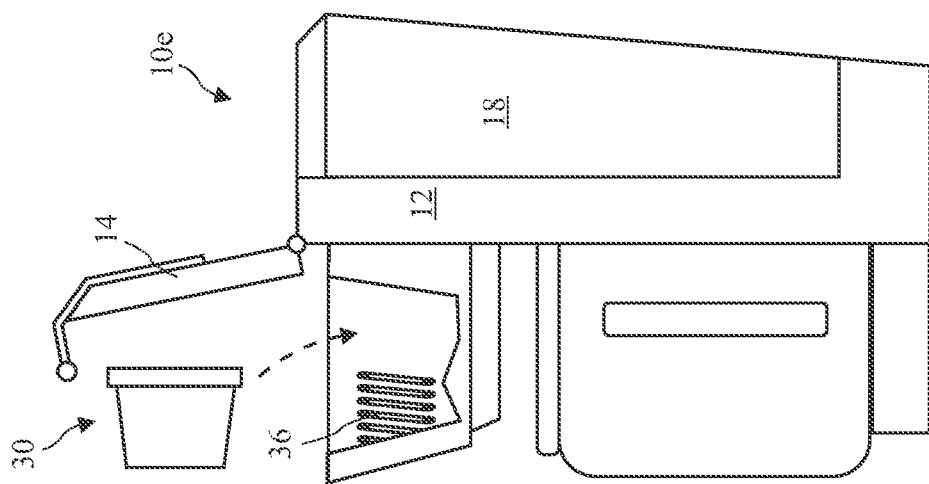
FIG. 40A shows an exemplary beverage brewer accepting a horizontal brewing material holder and tamping spring arranged horizontally in a brewing material holder cavity according to the present invention for tamping the beverage when the beverage brewer lid is closed.

A beverage brewer 10*e* for horizontally receiving the brewing material holder 30 is shown in FIG. 40A, the beverage brewer with the brewing material holder 30 arranged in the beverage brewer is shown in FIG. 40B, and the beverage brewer with the beverage brewer lid 14 closed and the tamping spring 36 entering the brewing material holder 30 for tamping the brewing material 41 is shown in FIG. 40C. The beverage brewer 10*d* can alternatively include a tamping spring entering the brewing material holder top, or a resilient solid block pushed into the brewing material holder 30 to tamp the beverage. Preferably, a horizontal ram 42*a* is actuated when the lid 14 is closed and pushes the brewing material holder 30 against the spring 36 to tamp the beverage. The horizontal ram 42*a* can be actuated by an electrical solenoid, by pressure, or by mechanical levers connected to the lid 14. The beverage brewer 10*e* can further include any of the features described above for other embodiments of the beverage brewer according to the present invention and can be configured to use any of the brewing material holders described above according to the present invention.

Figure 41:
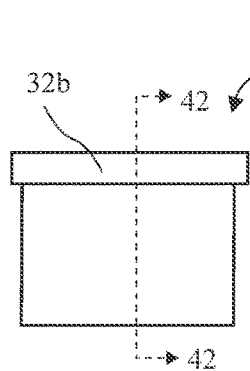
FIG. 41 is a side view of an exemplary brewing material holder with straight walls according to the present invention.
Figure 42:
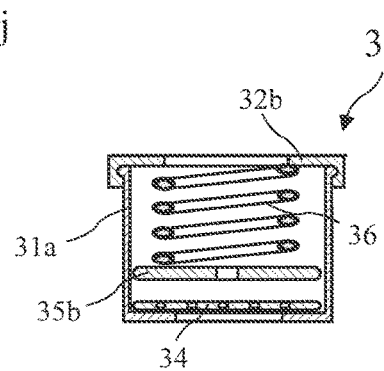
FIG. 42 is a cross-sectional view of an exemplary brewing material holder taken along line 42-42 of FIG. 41 showing an empty brewing material holder.

A side view of a brewing material holder 30*j* with straight walls according to the present invention is shown in FIG. 41, and a cross-sectional view of the brewing material holder 30*j* taken along line 42-42 of FIG. 41 showing an empty brewing material holder is shown in FIG. 42. The brewing material holder 30*j* provides straight cylindrically inside walls allowing a better fit between the top tamper 35*b* and the inside walls to reduce or eliminate brewing material 41 escaping past the top tamper 35*b* during tamping.

Figure 43:
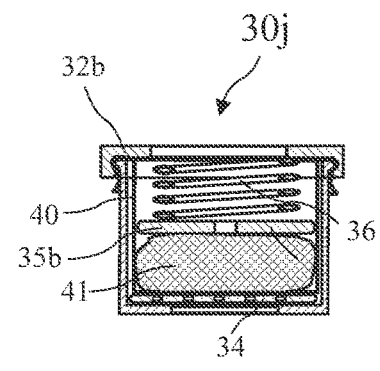
FIG. 43 is a cross-sectional view of an exemplary brewing material holder taken along line 42-42 of FIG. 41 showing a full and tamped brewing material holder.

A cross-sectional view of the brewing material holder 30*j* taken along line 42-42 of FIG. 41 showing a full and tamped brewing material holder is shown in FIG. 43. The tamping spring 36 has been pushed down by the lid 32*b* to tamp the brewing material 41.

Figure 44:
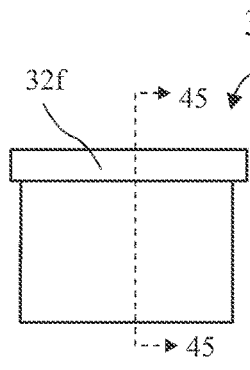
FIG. 44 is a side view of an exemplary brewing material holder with straight walls according to the present invention.
Figure 45:
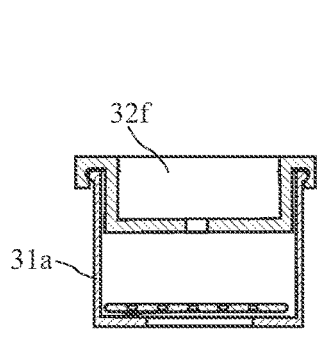
FIG. 45 is a cross-sectional view of an exemplary brewing material holder taken along line 45-45 of FIG. 44 showing an empty brewing material holder.
Figure 46:
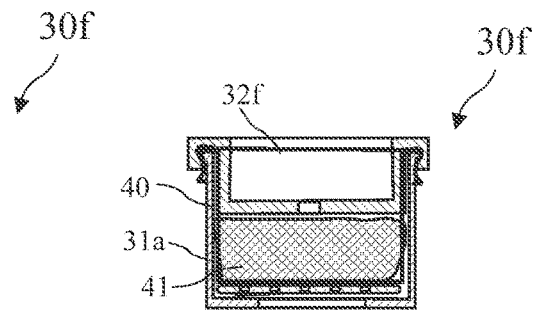
FIG. 46 is a cross-sectional view of an exemplary brewing material holder taken along line 45-45 of FIG. 41 showing a full and tamped brewing material holder.

A side view of an brewing material holder 30*k* with straight walls according to the present invention is shown in FIG. 44, a cross-sectional view of the brewing material holder 30*k* taken along line 45-45 of FIG. 44 showing an empty brewing material holder is shown in FIG. 45, and a cross-sectional view of the brewing material holder 30*k* taken along line 45-45 of FIG. 41 showing a full and tamped brewing material holder. As with the brewing material holder 30*j*, the brewing material holder 30*k* provides straight cylindrically inside walls allowing a better fit between the lid 32*f* and the inside walls to reduce or eliminate brewing material 41 escaping past the lid 32*f* during tamping. The lid 32*f* can be used with or without the top tamper 35*b*.

Figure 47B:
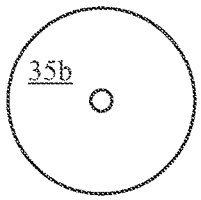
FIG. 47B is a top view of an exemplary top tamper.
Figure 47D:
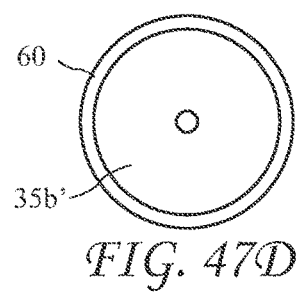
FIG. 47D is a top view of an exemplary top tamper with a seal.
Figure 47A:
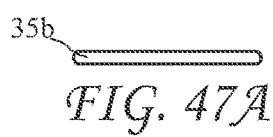
FIG. 47A is a side view of an exemplary top tamper.
Figure 47C:
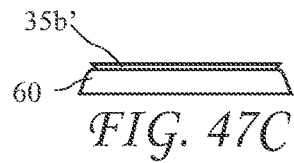
FIG. 47C is a side view of an exemplary top tamper with a seal according to the present invention.

A side view of a top tamper 35*b* is shown in FIG. 47A and a top view of the top tamper 35B is shown in FIG. 47B. A side view of a top tamper 35*b'* with a seal 60 according to the present invention is shown in FIG. 47C and a top view of the top tamper 35*b'* with the seal 60 is shown in FIG. 47D. In some instances, for example with a very fine ground beverage, an amount of beverage can escape past the top tamper 35*b*. In such instances, a user can prefer to use the top tamper 35*b'* with the seal 60 to reduce or eliminate the escape of the beverage.

Figure 7C:
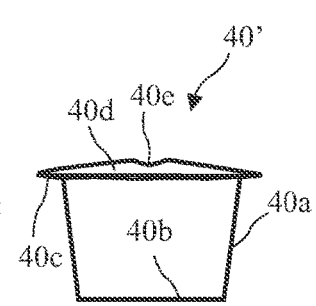
FIG. 7C is an exemplary embodiment of the filter paper cup with a lid.
Figure 48:
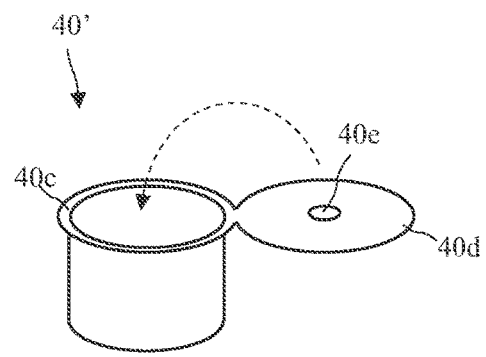
FIG. 48 is a perspective view of an exemplary filter paper cup with a folding cup lid.

A perspective view of a filter paper cup 40' with a folding cup lid 40*d* is shown in FIG. 48 (also see FIG. 7C). The cup lid 40*d* can be folded over the rim 40*c* to reduce or prevent beverage from escaping during tamping of subsequent processing. The lid 40*d* can also include a perforation 40*e* centered on the lid 40*d* allowing the nozzle 19 to enter and/or inject the hot flow of water into the tamped brewing material 41, but in some embodiments, the lid 40*d* does not include the perforation 40*e*. The filter paper cup 40' can be used in the beverage containers described herein, and can also be used in a beverage machine having a cavity for receiving the filter paper cup 40'. While the cup 40' is preferably made from filter paper, the cup can also be made from a reusable mesh.

Figure 49:
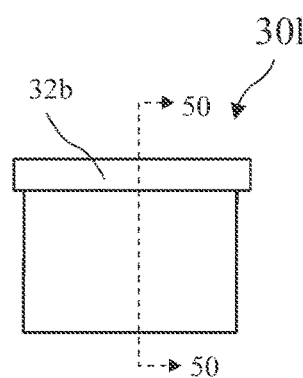
FIG. 49 is a side view of an exemplary brewing material holder with straight walls according to the present invention.
Figure 50:
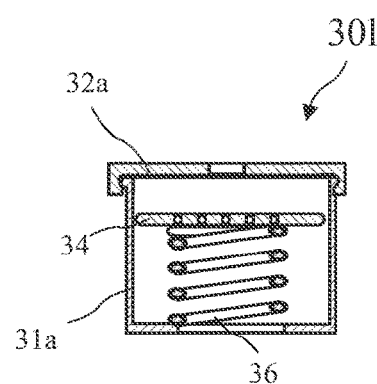
FIG. 50 is a cross-sectional view of an exemplary brewing material holder taken along line 50-50 of FIG. 49 showing an empty brewing material holder.

A side view of a brewing material holder 30l with straight walls according to the present invention is shown in FIG. 49, and a cross-sectional view of the brewing material holder 30l taken along line 50-50 of FIG. 49 showing an empty brewing material holder is shown in FIG. 50. The brewing material holder 30l includes a straight walled base and the tamping spring below the beverage, and additionally uses a filter paper cup 40' with the folding lid 40*d*.

Figure 51A:
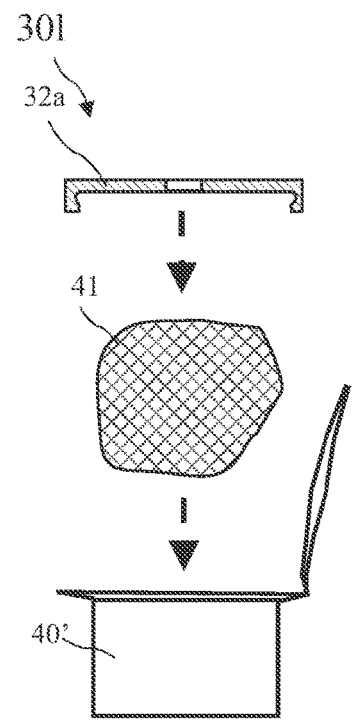
FIG. 51A is a cross-sectional view of an exemplary brewing material holder taken along line 50-50 of FIG. 49 showing a lid, beverage, a filter paper cup, above the base, and the brewing material holder base.
Figure 51B:
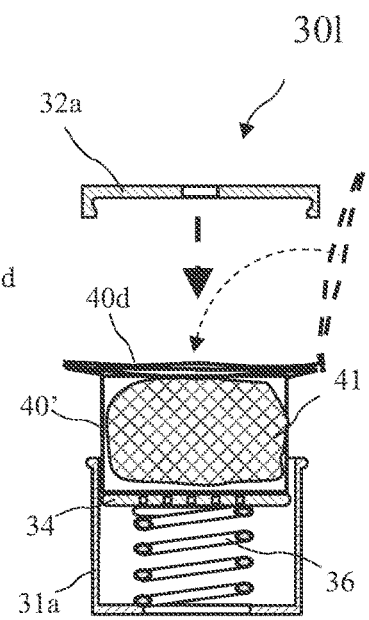
FIG. 51B is a cross-sectional view of an exemplary brewing material holder taken along line 50-50 of FIG. 49 showing the lid, above the beverage and the filter paper cup resting in the brewing material holder base.
Figure 51C:
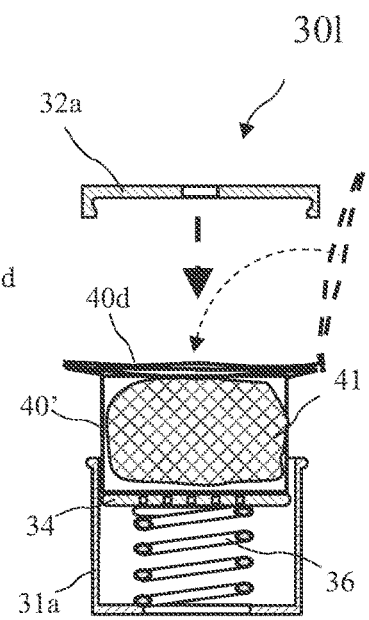
FIG. 51C is a cross-sectional view of an exemplary brewing material holder taken along line 50-50 of FIG. 49 showing the lid, above the beverage and the filter paper cup resting in the brewing material holder base with a filter paper cover folded over the beverage in the filter paper cup.
Figure 51D:
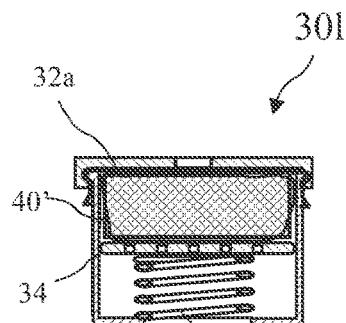
FIG. 51D is a cross-sectional view of an exemplary brewing material holder taken along line 50-50 of FIG. 49 showing the lid attached to the base with the beverage and the filter paper cup arranged in the brewing material holder base with the beverage tamped.

A cross-sectional view of the brewing material holder 30l taken along line 50-50 of FIG. 49 showing the lid 32*a*, brewing material 41, the filter paper cup 40' with lid 40*d*, above the brewing material holder base 31*a* is shown in FIG. 51A, a cross-sectional view of the brewing material holder 30l taken along line 50-50 of FIG. 49 showing the lid 32*a*, above the brewing material 41 and the filter paper cup 40' resting in the brewing material holder base 31*a* is shown in FIG. 51B, a cross-sectional view of the brewing material holder 30l taken along line 50-50 of FIG. 49 showing the lid 32*a*, above the brewing material 41 and the filter paper cup 40' resting in the brewing material holder base 31*a* with the filter paper cover 40*d* folded over the brewing material 41 in the filter paper cup 40' is shown in FIG. 51C, and a cross-sectional view of the brewing material holder 30l taken along line 50-50 of FIG. 49 showing the lid 32*a* attached to the base 31*a* with the brewing material 41 and the filter paper cup 40' arranged in the brewing material holder base 31*a* with the brewing material 41 tamped is shown in FIG. 51D. In embodiments with the brewing material 41 partially exposed above the base 31*a*, some brewing material 41 can escape during tamping. Using the filter paper cup 40' having the fold over paper lid 40*d* reduces or eliminates such escape of brewing material 41.

Figure 52:
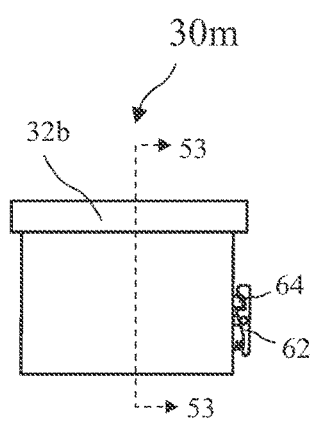
FIG. 52 is a side view of an exemplary brewing material holder with a releaseable tamping latch according to the present invention.
Figure 53:
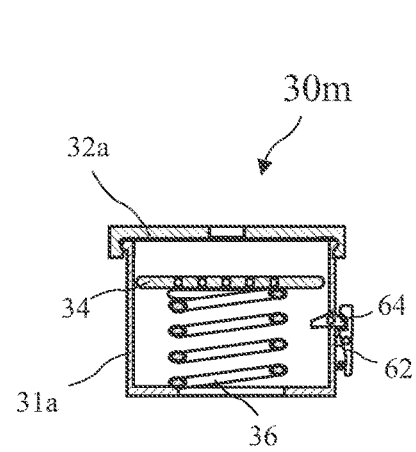
FIG. 53 is a cross-sectional view of an exemplary brewing material holder taken along line 53-53 of FIG. 52 showing an empty brewing material holder.

A side view of a brewing material holder 30*m* with a releaseable tamping latch 64 according to the present invention is shown in FIG. 52 and a cross-sectional view of the brewing material holder 30*m* taken along line 53-53 of FIG. 52 showing an empty brewing material holder is shown in FIG. 53. The latch 64 is held in a latched position by a spring-loaded lever 62 on the exterior of the base 31*a*.

Figure 54A:
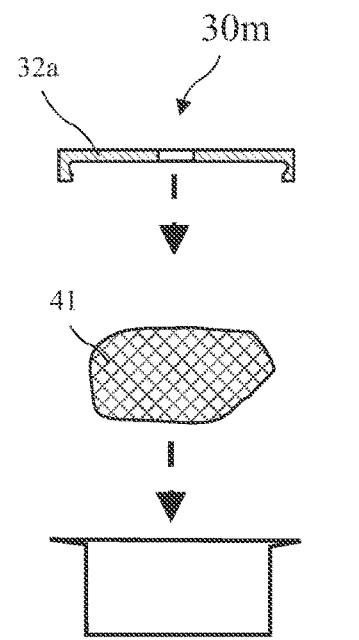
FIG. 54A is a cross-sectional view of an exemplary brewing material holder taken along line 53-53 of FIG. 52 showing a lid, beverage, a filter paper cup, above the base, and the brewing material holder base, with the tamping latch retaining the bottom tamper.
Figure 54B:
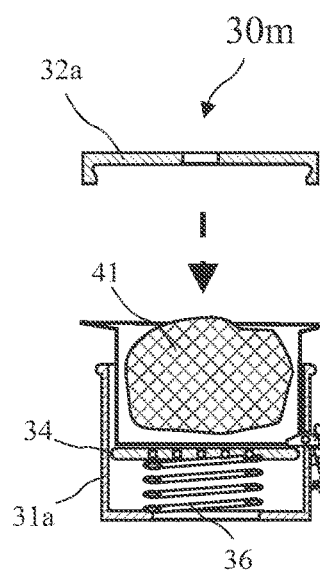
FIG. 54B is a cross-sectional view of an exemplary brewing material holder taken along line 53-53 of FIG. 52 showing the lid, above the beverage and the filter paper cup resting in the brewing material holder base, with the tamping latch retaining the bottom tamper.
Figure 54C:
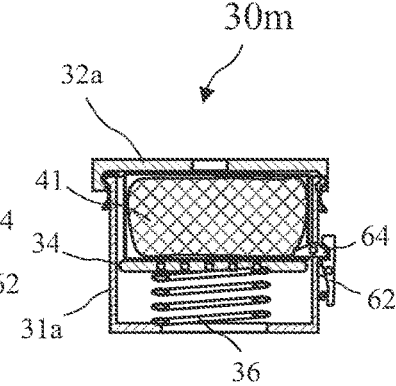
FIG. 54C is a cross-sectional view of an exemplary brewing material holder taken along line 53-53 of FIG. 52 showing the lid, above the beverage and the filter paper cup resting in the brewing material holder base with the tamping latch retaining the bottom tamper.
Figure 54D:
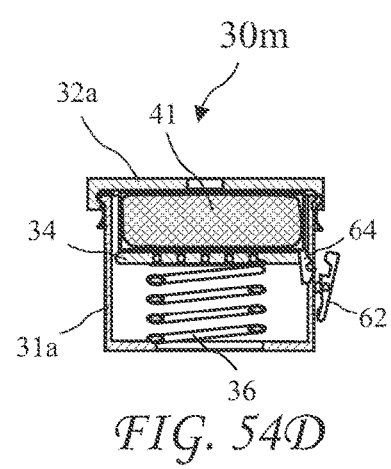
FIG. 54D is a cross-sectional view of an exemplary brewing material holder taken along line 53-53 of FIG. 52 showing the lid attached to the base with the beverage and the filter paper cup arranged in the brewing material holder base with tamping latches released and the beverage tamped.

A cross-sectional view of the brewing material holder 30*m* taken along line 53-53 of FIG. 52 showing the lid 32*a*, brewing material 41, the filter paper cup 40, above the base 31*a*, and the brewing material holder base 31*a*, with the tamping latch 64 retaining the bottom tamper 34 is shown in FIG. 54A, a cross-sectional view of the brewing material holder 30*m* taken along line 53-53 of FIG. 52 showing the lid 32*a* above the brewing material 41 and the filter paper cup 40 resting in the brewing material holder base 31*a*, with the tamping latch 64 retaining the bottom tamper 34 is shown in FIG. 54B, a cross-sectional view of the brewing material holder 30*m* taken along line 53-53 of FIG. 52 showing the lid 32*a*, above the brewing material 41 and the filter paper cup 40 resting in the brewing material holder base 31*a* with the tamping latch 64 retaining the bottom tamper 34 is shown in FIG. 54C, and a cross-sectional view of the brewing material holder 30*m* taken along line 53-53 of FIG. 52 showing the lid 32*a* attached to the base 31*a* with the brewing material 41 and the filter paper cup 40 arranged in the brewing material holder base 31*a* with tamping latch 64 released and the brewing material 41 tamped is shown in FIG. 54D. The lever 62 thus holds the latch 64 until the lever 62 is pushed to release the latch 62 to release the bottom tamper 34 to tamp the brewing material 41.

Figure 55:
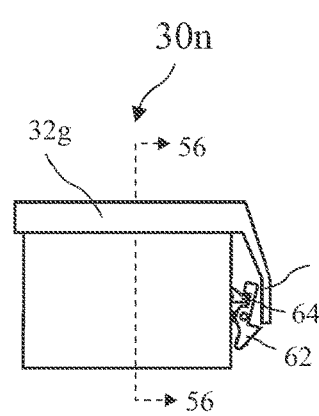
FIG. 55 is a side view of an exemplary brewing material holder with a releaseable tamping latch according to the present invention.
Figure 56:
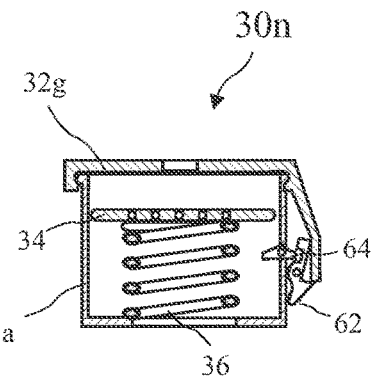
FIG. 56 is a cross-sectional view of an exemplary brewing material holder taken along line 56-56 of FIG. 55 showing an empty brewing material holder.

A side view of a brewing material holder 30*n* with a releaseable tamping latch 64 according to the present invention is shown in FIG. 55 and a cross-sectional view of the brewing material holder taken along line 56-56 of FIG. 55 showing an empty brewing material holder is shown in FIG. 56. The lever 62 holds the latch 64 until the arm 66 attached to the lid 32*g* pushes the lever 62 to release the latch 64.

Figure 57A:
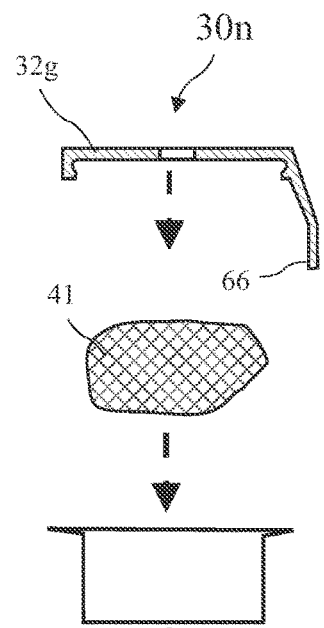
FIG. 57A is a cross-sectional view of an exemplary brewing material holder taken along line 56-56 of FIG. 55 showing a lid, beverage, a filter paper cup, above the base, and the brewing material holder base, with the tamping latch retaining the bottom tamper.
Figure 57B:
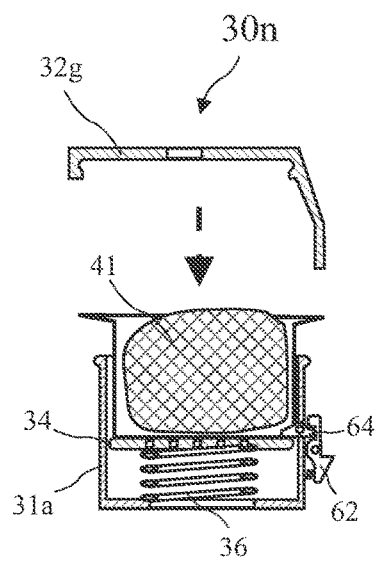
FIG. 57B is a cross-sectional view of an exemplary brewing material holder taken along line 56-56 of FIG. 55 showing the lid, above the beverage and the filter paper cup resting in the brewing material holder base, with the tamping latch retaining the bottom tamper.
Figure 57C:
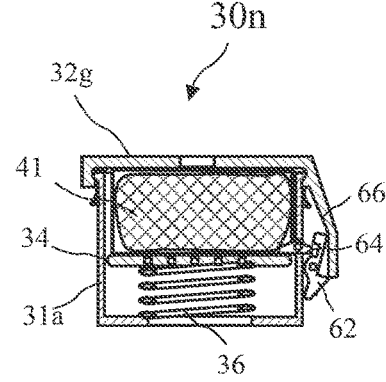
FIG. 57C is a cross-sectional view of an exemplary brewing material holder taken along line 56-56 of FIG. 55 showing the lid, above the beverage and the filter paper cup resting in the brewing material holder base, with the tamping latch released but just prior to tamping.
Figure 57D:
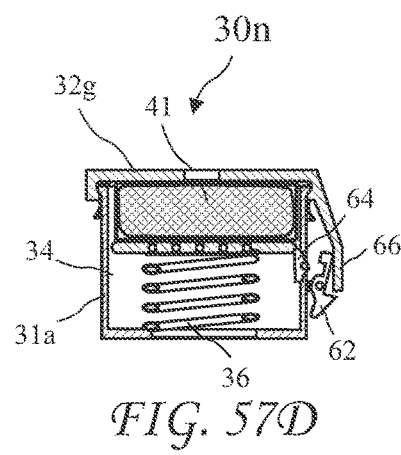
FIG. 57D is a cross-sectional view of an exemplary brewing material holder taken along line 56-56 of FIG. 55 showing the lid attached to the base with the beverage and the filter paper cup arranged in the brewing material holder base with tamping latches released and the beverage tamped.

A cross-sectional view of the brewing material holder 30*n* taken along line 56-56 of FIG. 55 showing the lid 32*g*, brewing material 41, and the filter paper cup 40, above the brewing material holder base 31*a*, with the tamping latch 64 retaining the bottom tamper 34 is shown in FIG. 57A, a cross-sectional view of the brewing material holder 30*n* taken along line 56-56 of FIG. 55 showing the lid 32*g* above the brewing material 41 and the filter paper cup 40 resting in the brewing material holder base 31*a*, with the tamping latch 64 retaining the bottom tamper 34 is shown in FIG. 57B, a cross-sectional view of the brewing material holder 30*n* taken along line 56-56 of FIG. 55 showing the lid 32*g*, above the brewing material 41 and the filter paper cup 40 resting in the brewing material holder base 31*a* with the tamping latch 64 released but just prior to tamping (the bottom tamper has been released but has not moved upward against the brewing material 41) is shown in FIG. 57C, and a cross-sectional view of the brewing material holder 30*n* taken along line 56-56 of FIG. 55 showing the lid 32*g* attached to the base with the brewing material 41 and the filter paper cup 40 arranged in the brewing material holder base 31 a with tamping latch 64 released and the brewing material 41 tamped is shown in FIG. 57D. The lever 62 thus holds the latch 64 until the lever 62 is pushed by the arm 66 to release the latch 62 to release the bottom tamper 34 to tamp the brewing material 41.

Figure 58:
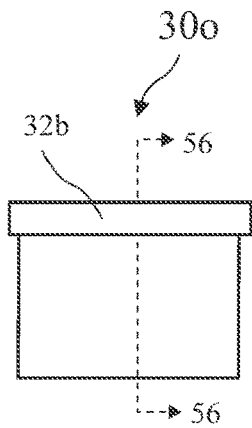
FIG. 58 is a side view of an exemplary brewing material holder with a releaseable tamping lock according to the present invention.
Figure 59:
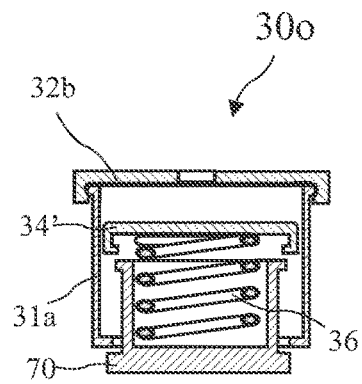
FIG. 59 is a cross-sectional view of an exemplary brewing material holder taken along line 59-59 of FIG. 58 showing an empty brewing material holder.

A side view of a brewing material holder 300 with a releaseable tamping lock according to the present invention is shown in FIG. 58 and a cross-sectional view of the brewing material holder 300 taken along line 59-59 of FIG. 58 showing an empty brewing material holder is shown in FIG. 59. The brewing material holder 300 includes a tamping lock 70 which engages a bottom tamper 34' to hold the bottom tamper in a down position for filling the brewing material holder with beverage and releases the bottom tamper 34' to be pushed upward by the tamping spring 36 to tamp the beverage after the holder lid 32b is attached to the base 31a.

Figure 60A:
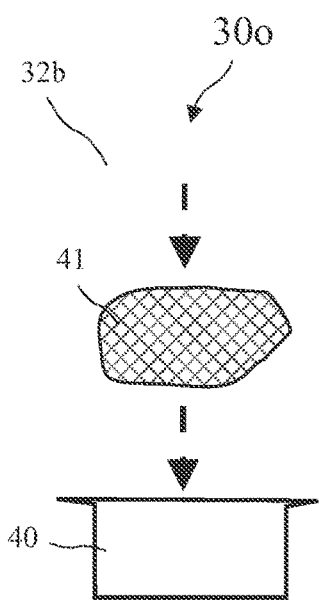
FIG. 60A is a cross-sectional view of an exemplary brewing material holder taken along line 59-59 of FIG. 58 showing a lid, beverage, a filter paper cup, above the base, and the brewing material holder base, with the tamping lock retaining the bottom tamper.
Figure 60B:
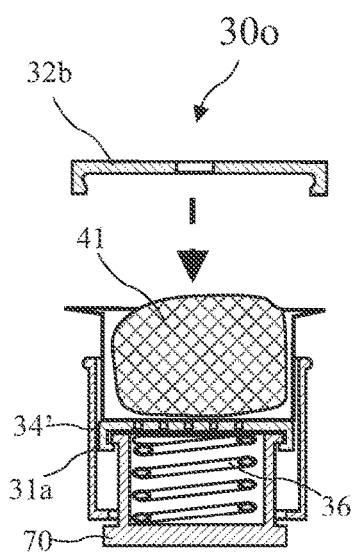
FIG. 60B is a crass-sectional view of an exemplary brewing material holder taken along line 59-59 of FIG. 58 showing the lid, above the beverage and the filter paper cup resting in the brewing material holder base, with the tamping lock retaining the bottom tamper.
Figure 60C:
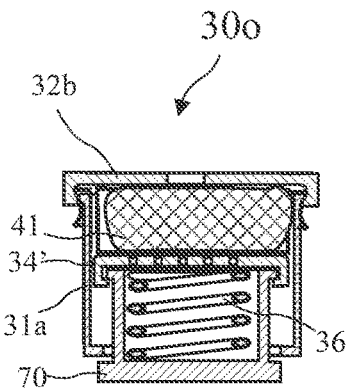
FIG. 60C is a cross-sectional view of an exemplary brewing material holder taken along line 59-59 of FIG. 58 showing the lid, above the beverage and the filter paper cup resting in the brewing material holder base prior to tamping.
Figure 60D:
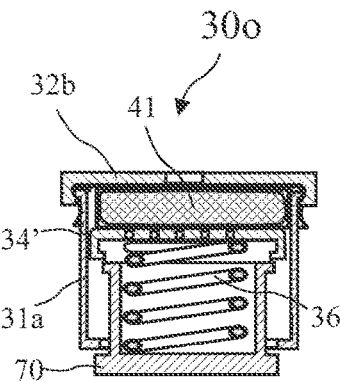
FIG. 60D is a cross-sectional view of an exemplary brewing material holder taken along line 59-59 of FIG. 58 showing the lid attached to the base with the beverage and the filter paper cup arranged in the brewing material holder base with tamping lock released and the beverage tamped.

A cross-sectional view of the brewing material holder 300 taken along line 59-59 of FIG. 58 showing a lid 32b, brewing material 41, a filter paper cup 40, above the brewing material holder base 31, with the tamping lock 70 retaining the bottom tamper 34' is shown in FIG. 60A, a cross-sectional view of the brewing material holder taken along line 59-59 of FIG. 58 showing the lid, above the beverage and the filter paper cup resting in the brewing material holder base, with the tamping latch retaining the bottom tamper 34' is shown in FIG. 60B, a cross-sectional view of the brewing material holder taken along line 59-59 of FIG. 58 showing the lid, above the beverage and the filter paper cup resting in the brewing material holder base prior to tamping is shown in FIG. 60C, and a cross-sectional view of the fourteenth brewing material holder taken along line 59-59 of FIG. 58 showing the lid 32b attached to the base 31a with the brewing material 41 and the filter paper cup 40 arranged in the brewing material holder base 31a with tamping lock released and the beverage tamped is shown in FIG. 60D.

Figure 61:
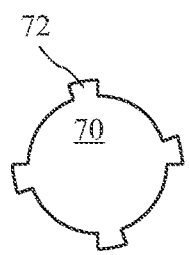
FIG. 61 is a top view of an exemplary lock according to the present invention.
Figure 62:
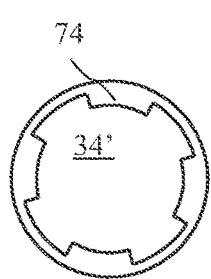
FIG. 62 is a bottom view of an exemplary bottom tamper with cooperates with the tamping lock according to the present invention.

A top view of a tamping lock 70 according to the present invention is shown in FIG. 61 and a bottom view of a bottom tamper 34' that cooperates with the tamping lock 70 according to the present invention is shown ion FIG. 62. The tamping lock 70 includes teeth 72 that are inserted between and turned to engage lips 74 on the bottom of the bottom tamper 34' to hold the bottom tamper in the down position for filling the brewing material holder 300 with brewing material 41. After the brewing material holder 300 is filled with beverage and the holder lid 32b attached, the tamping lock is twisted to release the bottom tamper 32b to tamp the beverage.

Figure 63A:
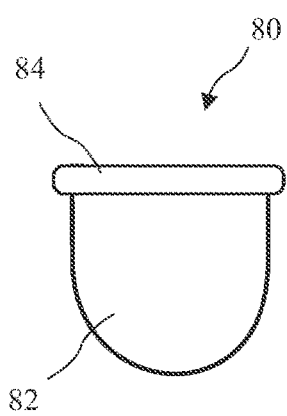
FIG. 63A is a side view of an exemplary filter cup according to the present invention.
Figure 63B:
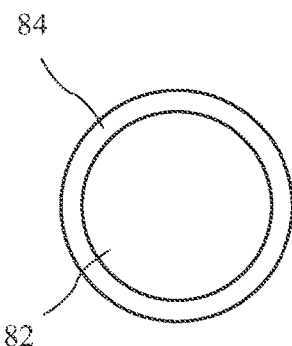
FIG. 63B is a top view of an exemplary filter cup according to the present invention.

A side view of a filter cup 80 according to the present invention is shown in FIG. 63A and a top view of the filter cup 80 is shown in FIG. 63B. The filter cup 80 includes a ring 84 made of a material sufficiently strong to hold its shape in the proposed use. Filter material 82 is attached to the ring 84. The filter cup 80 is insertable into the brewing material holder and in some embodiments is a replacement for the filter paper cup 40.

Figure 64:
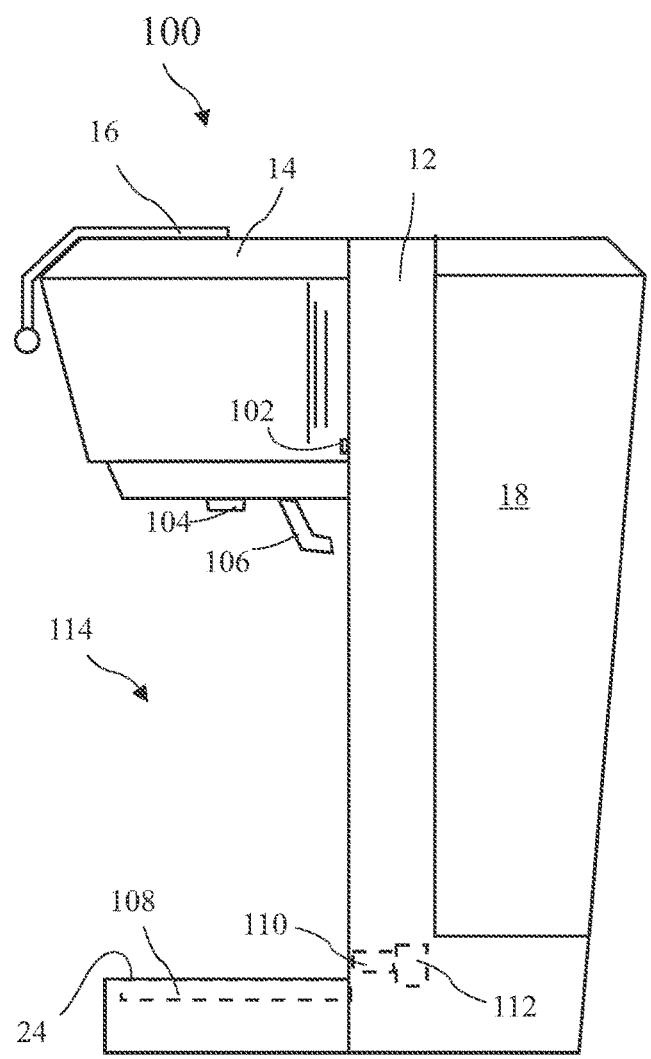

A side view of a multi-mode beverage brewer 100 according to the present invention is shown in FIG. 64. The multi-mode beverage brewer 100 allows the user to make a selectable amount of brewed beverage, such as a single cup of beverage or several cups of beverage. The multi-mode beverage brewer 100 includes manually-operated controls 102 for selecting a volume of water for a single cup of beverage or to fill a carafe, arranged in the mouth 114 of the multi-mode beverage brewer 100. The controls 102 can also allow selection of a large or small cup of beverage, and of hot water only. Alternatively, the multi-mode beverage brewer 100 can detect the presence of a single-cup adapter 118 and limit the volume of beverage produced to an amount appropriate for a single cup, for example, as an override if a user accidentally selects a volume of beverage too large for a single cup.

A spout/drip valve 104 releases the desired amount of beverage into a carafe or beverage container positioned on a beverage brewer platform 24, and a drip valve actuator (or valve lever) 106 is actuateable to open and close the spout/drip valve 104. In other examples, the drip valve actuator can be pneumatic, hydraulic, or electric, and can be any mechanical link that opens the spout/drip valve 104. The spout/drip valve 104 can further be manually opened by a user. For example, the spout/drip valve 104 is opened by placing the multi-cup brewed beverage container 26 in the beverage brewer 100 and openable for use of the single cup brewed beverage container 116 by either a mechanical or electrically operated actuator or by positioning of the single-cup adapter 118 for use of the single cup.

In another embodiment the spout/drip valve 104 is opened by the positioning of a single-cup adapter into position for use of a single cup in the beverage brewer, for example by an arm on the single-cup adapter cooperating with a lever connected to the spout/drip valve, by an arm arranged at the rear of the mouth, the single-cup adapter pushing against the arm to open the spout/drip valve, or by any mechanical or electrical apparatus connected to the spout/drip valve and actuated by positioning the single-cup adapter to use a single cup in the beverage brewer. In still another embodiment the flow of brewed beverage is controlled by turning the pump 21 on and off, by controlling a boiler, or by controlling a valve preventing the flow of water to the brewing material holder.

A hot plate 108 is recessed on the top surface of the platform 24 and the recess is larger than the footprint of the multi-cup brewed beverage container (or carafe) 26 allowing contact with the hot plate 108 for keeping a carafe at a minimum temperature. A passage 110 allows a finger 120 of a single-cup adapter 118 (see FIG. 67B) to engage a switch 112 to change an operating mode of the beverage brewer, for example to turn off the hot plate 108 when the single-cup adapter 118 is in use. The passage 110 is preferably aligned with the platform 24, offset above a top surface of the platform 24.

Figure 65B:
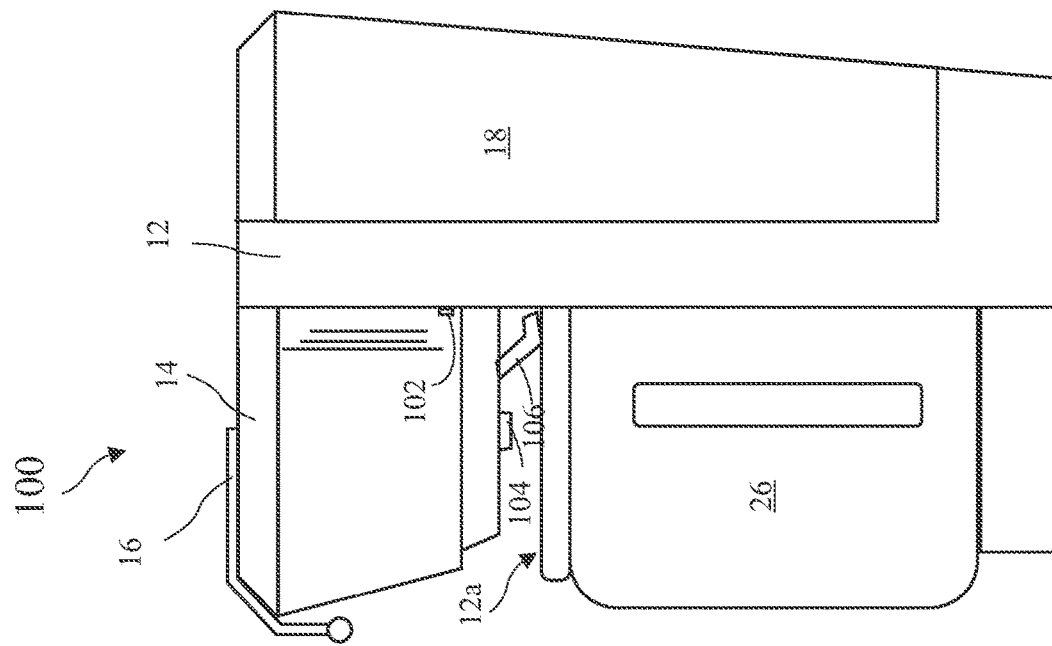
Figure 65A:
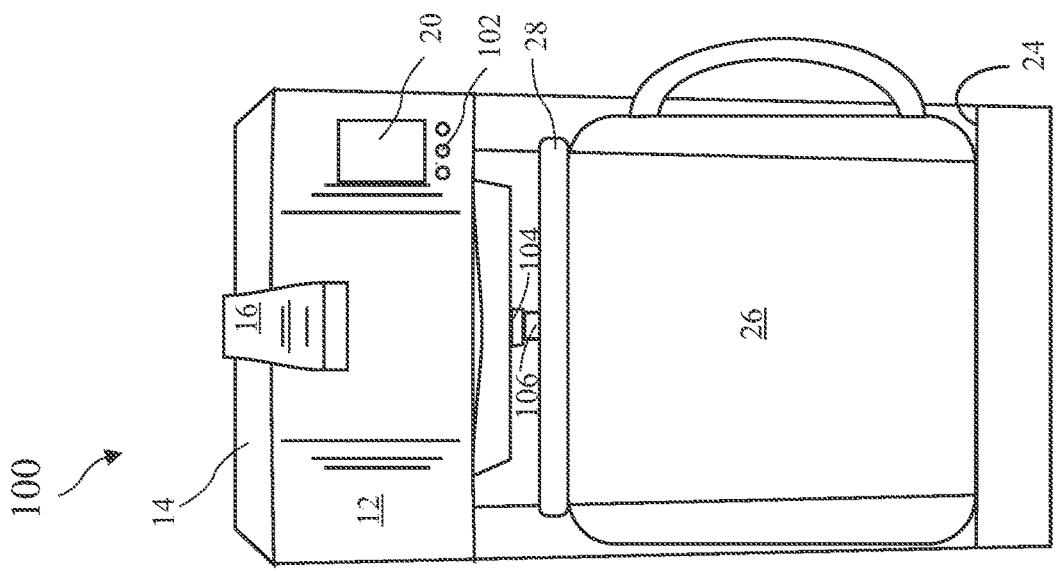

A front view of the multi-mode beverage brewer 100 with a carafe 26 arranged on the platform 24 for receiving a selected volume of beverage is shown in FIG. 65A and a side view of the multi-mode beverage brewer 100 with the carafe 26 positioned for receiving a selected volume of beverage is shown in FIG. 65B. The top edge of the carafe 26 pushes the valve lever 106 upward, opening the spout/drip valve 104 to allow the selected volume of beverage to flow into the carafe 26.

Figure 66B:
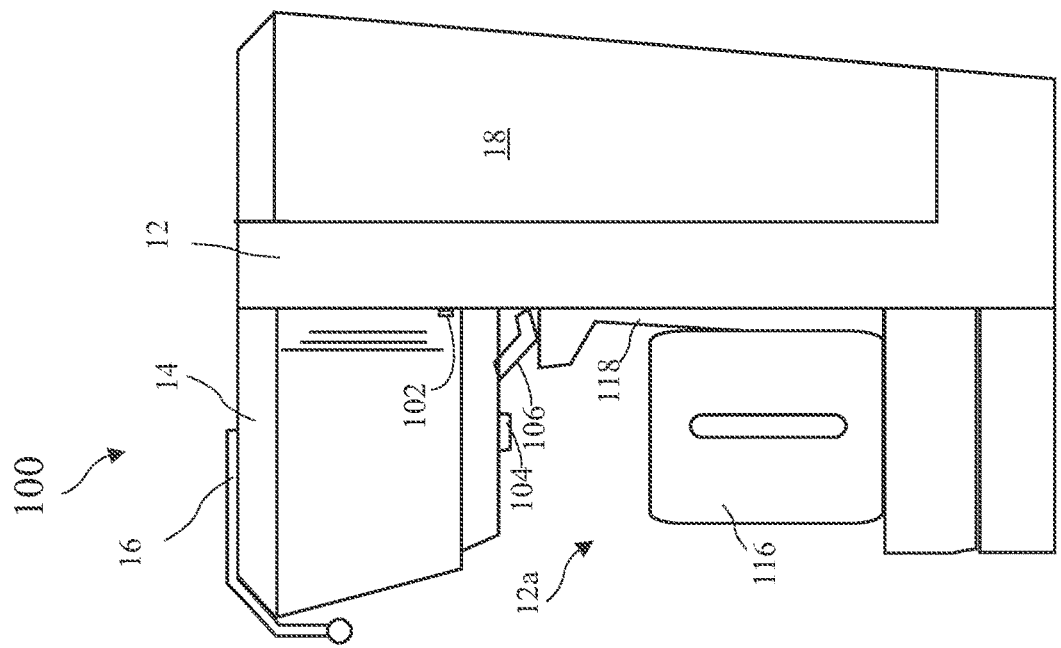
Figure 66A:
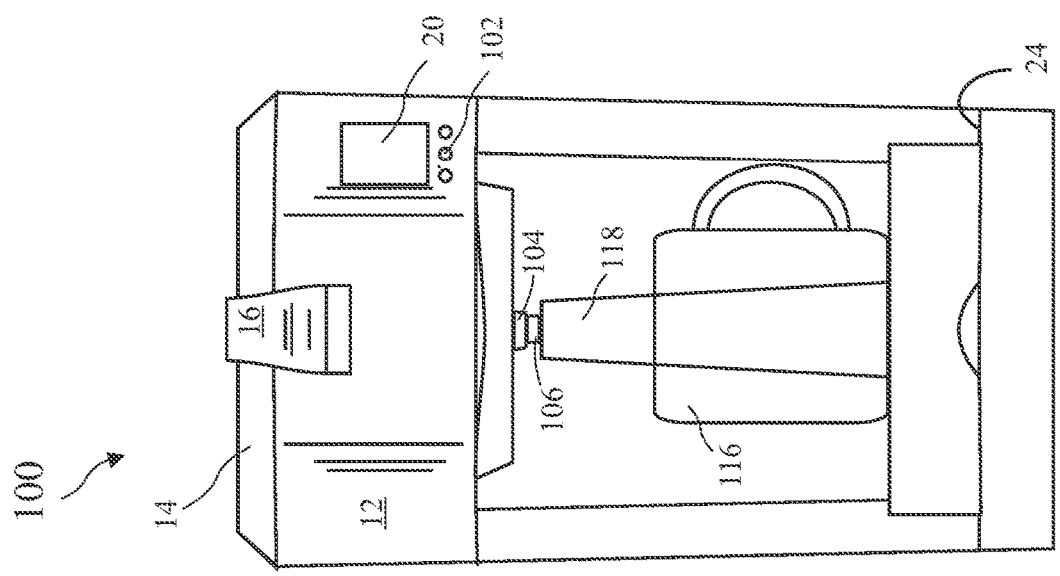

A front view of the multi-mode beverage brewer 100 with a beverage cup (or single-cup brewed beverage container) 116 arranged on a single-cup adapter 118 for receiving the selected volume of beverage is shown in FIG. 66A and a side view of the multi-mode beverage brewer 100 with the beverage cup arranged on the single-cup adapter 118 for receiving the selected volume of beverage is shown in FIG. 66B. The single-cup adapter 118 includes an upward-reaching arm portion 118 (see FIG. 67B) that pushes the valve lever 106 upward, opening the spout/drip valve 104 to allow the selected volume of beverage to flow into the beverage cup 116.

Figure 67C:
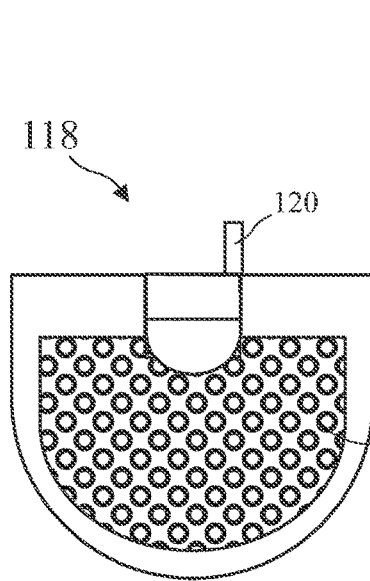
Figure 68:
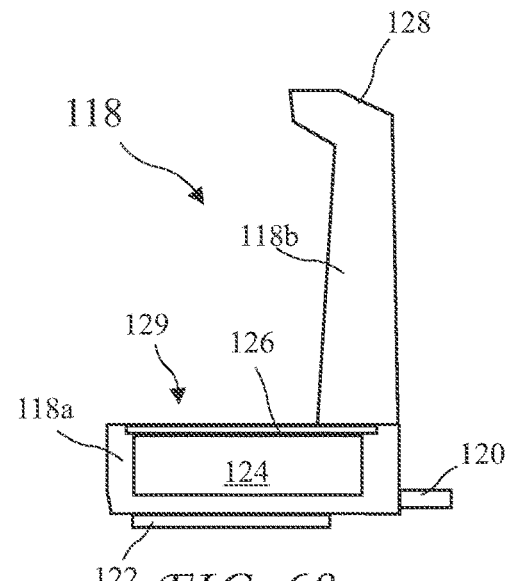
Figure 67A:
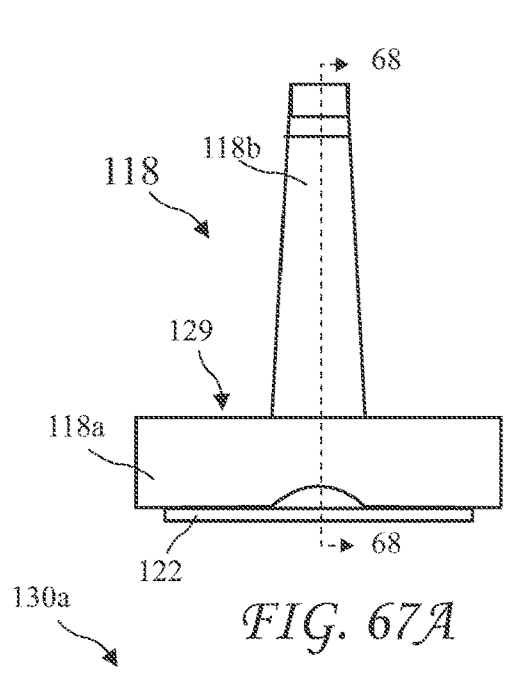
Figure 67B:
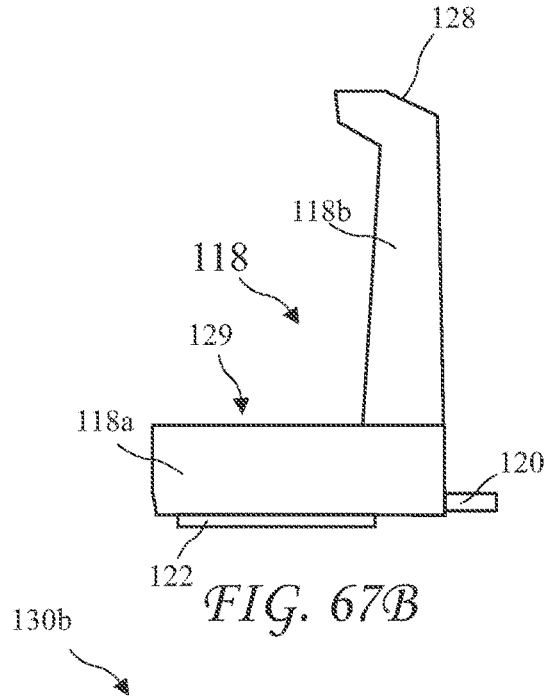

A front view of a single-cup adapter 118 according to the present invention is shown in FIG. 67A, a side view of the single-cup adapter 118 is shown in FIG. 67B, a top view of the single-cup adapter 118 is shown in FIG. 67C, and a cross-sectional view of the single-cup adapter 118 taken along line 68-68 of FIG. 67A is shown in FIG. 68. The single-cup adapter 118 includes a base portion 118a that includes a single cup platform 129 for supporting the beverage cup 116, and a drip basin (or tray) 124 for catching and holding drops from the spout/drip valve 104. A grill 126 is arranged over the drip basin 124 and the beverage cup 116 rests on the grill 126. An arm portion 118b reaches up and an angled surface 128 at the top of the arm portion 118b cooperates with the valve lever 106 to open the spout/drip valve 104 when the single-cup adapter 118 is positioned in the beverage brewer 100. In another embodiment, the drip tray can be integrated into the beverage brewer 100 and can pivot or slide into position under the beverage cup 116; for example, the single-cup adapter 118 can have an open side or rear that the drip tray slides or pivots into.

A downward protrusion 122 on the bottom of the base portion 118a fits into a recess in the platform 24 to correctly position the single-cup adapter 118 in the mouth 114 of the beverage brewer 100, and to resist easy detachment of the single-cup adapter 118 from the beverage brewer 100. A rearward-reaching finger 120 enters the passage 110 to actuate the switch 112 (see FIG. 64) to turn off the hot plate when the single-cup adapter 118 is attached to the beverage brewer 100. The finger 120 and switch 112 arrangement is one example of an arrangement for turning off the hot plate 108 when the single-cup adapter 118 is attached to the beverage brewer 100. Other arrangements include a magnet switch detecting the presence of the hot plate 108 in the single-cup adapter 118 by the proximity of a magnet and piece of magnetically-attractive metal or a second magnet, a switch in the platform, or even a manual switch, and a beverage brewer according to the present invention with any switch for turning off the hot plate is intended to be included within the scope of the present invention.

A side view of a multi-serving dry brewing material holder 130a according to the present invention for use in the multi-mode beverage brewer 100 for making several cups of brewed beverage is shown in FIG. 66A and a side view of a single-serving dry brewing material holder 130b according to the present invention for use in the multi-mode beverage brewer 100 for making one cup of beverage is shown in FIG. 66B. A variety of dry brewing material holders 30a-30o and means for containing and tamping dry beverage in a beverage brewer are disclosed in FIGS. 3 though 63B, and a multi-mode beverage brewer 100 including any of the brewing material holders disclosed herein, or any other brewing material holder, is intended to be included within the scope of the present invention.

Figure 69A:
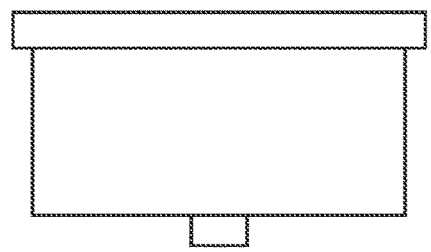
Figure 69B:
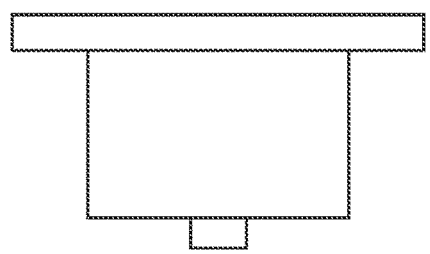

Side views of a multi-serving brewing material holder 130a and a side view of a single-serving brewing material holder 130b, for use in the multi-mode beverage brewer for making several cups of beverage or a single cup of beverage, are shown in FIGS. 69A and 69B, respectively.

A perspective view of a beverage brewer accessory platform (for example, a mug tray) 200 is shown in FIG. 70A and a top view of the beverage brewer mug tray 200 is shown in FIG. 70B. The mug tray 200 includes a pivoting mug (or small cup) support 204 and an actuating assembly 206. A finger 218 extends back from the pivoting mug support 204 to engage the actuating assembly 206. The pivoting mug support 204 cooperates with a base 202 through a pivot 208.

A top perspective view of the mug tray base 202 is shown in FIG. 71A and a front perspective view of the base 202 is shown in FIG. 71B. The pivot 208 is shown on the left side of the base 202 and the actuating assembly 206 is shown at the rear of the base 202.

A right front perspective view of the beverage brewer mug tray 200, with a grill removed, is shown in FIG. 72A and a right rear perspective view of the beverage brewer mug tray 200, with the grill removed, is shown in FIG. 72B. The finger 218 extends from the rear of the pivoting mug support 204 to engage the actuating assembly 206.

A perspective top view of the actuating assembly 206 is shown in FIG. 73A, a bottom view of the actuating assembly 206 is shown in FIG. 73B, a perspective top view of actuator elements 206a of the actuating assembly 206 is shown in FIG. 74A, and a bottom view of the actuator elements 206a is shown in FIG. 74B. The actuator elements 206a include a pivoting actuator 212, a slide 210, and a spring 216 in an actuator housing 206b. The pivoting actuator 212 pivots about a post (or pivot axis) 207 proximal to a center of the housing 206b and includes an arm 212a and a magnetic element holder 212b. The spring 216 biases the pivoting actuator 212 to center a first magnetic element 214 to the rear adjacent to a sensing (or second magnetic) element 215 (see FIGS. 75A-76B) in the beverage brewer. When the magnetic elements 214 and 215 are close together, the second magnetic element 215 senses the first magnetic element 214 and changes an operating mode of the beverage brewer. The operating mode can be control of a hot plate at the base of the mouth or can vary the amount of brewed drink provided. For example, the modes can be a multi-cup mode in the beverage brewer when the magnetic elements 214 and 215 are adjacent, allowing larger amounts of brewed beverage, and a single-cup mode when the magnetic elements 214 and 215 are separated. Either one or both of the magnetic elements 214 and 215 can be permanent magnets or electro-magnets, and when only one is a permanent magnet or electro-magnet, the other is a magnetically-attracted material, for example, a ferrous material. The sensing element 215 can be a Hall-effect sensor to sense the proximity of an electrical conducting material arranged in the element holder 212b.

In other embodiments, a mug tray can mechanically cooperate with a switch in the beverage brewer (for example, the pivoting actuator can mechanically cooperate with a switch in the beverage brewer), the mug tray can optically cooperate with a switch in the beverage brewer, or the mug tray can close an electrical circuit to cooperate with a switch in the beverage brewer. Those skilled in the art will recognize various cooperating structures allowing the beverage brewer to sense the presence of the mug tray, or position of a sliding switch, and any such sensing structure used to select the single cup mode or the multi-cup mode is intended to be included within the scope of the present invention.

A top view of a drip tray 204 of the beverage brewer mug tray 200 pivoted away from the beverage brewer and the pivoting actuator 212 and magnetic element 214 cooperating with the sensing element 215 of the beverage brewer is shown in FIG. 75A and a top view of the drip tray 204 pivoted into the beverage brewer causing the pivoting actuator 212 and magnetic element 214 to be pivoted away from the sensing element 215 of the beverage brewer is shown in FIG. 75B. The finger 218 is shown to push the arm 212a to pivot the magnetic element holder 212b and magnetic element 214 away from the sensing element 215.

A top view of the slide 210 of the actuating assembly 206 disengaged from the pivoting actuator 212 and the pivoting actuator 212 and magnetic element 214 cooperating with the sensing element 215 of the beverage brewer is shown in FIG. 76A and a top view of the slide of the actuating assembly engaged with the pivoting actuator 212 and the pivoting actuator 212 and magnetic element 214 pivoted away from the sensing element 215 of the beverage brewer is shown in FIG. 76B. When the slide 210 is moved against the arm 212a, the pivoting actuator 212 pivots clockwise (top view), and the magnet holder 212b and magnetic element 214 are moved away from the sensing element 215. The slide 210 thus allows the drip tray 204 to be pivoted away from the beverage brewer while the slide 210 selects the single or multi-cup mode.

A beverage brewer accessory carafe 26 having a finger 120 for cooperating with the beverage brewer to change an operating mode is shown in FIG. 77. The mode can be providing power to a hot plate, or other operating mode.

While the present invention is described above as a brewer in which loose brewing material is placed in a brewing material holder, the invention can also be practiced by placing prepackaged beverage material, for example beverage pods, into the brewing material holder. Further, while the brewing material holder is generally described as having a snap-on lid, a screw-on lid or any known type of lid can also be used, and in general the various elements of different embodiments described above can be mixed to provide new embodiments and such new embodiments are intended to be included within the scope of the present invention.

Further, some embodiments are described as including a beverage chamber comprising a filter paper cup. In many cases, a filter cup made of nylon mesh or metal mesh is equally suitable, and any brewing material holder or combination of beverage brewer and brewing material holder including a filter chamber that holds beverage material and allows the beverage material to be tamped as described above is intended to be included within the scope of the present invention regardless of the specific filter material.

While the invention herein disclosed has been described by means of specific embodiments and applications thereof, numerous modifications and variations could be made thereto by those skilled in the art without departing from the scope of the invention set forth in the claims.

I claim:

1. A multi-mode beverage brewer, comprising:
   a body;
   chamber means arranged in the body for receiving and containing beverage brewing material, for receiving a flow of water from a water source and through the beverage brewing material, thereby brewing a beverage, and for releasing the brewed beverage through a chamber means outlet;
   flow-control means arranged in the body for controlling the flow of water to the chamber means such that in a first mode a first quantity of water or in a second mode a second quantity of water is provided to the chamber means;
   selection means for actuating the first mode or the second mode of the flow-control means; and
   support means for supporting a brewed beverage container to receive the brewed beverage from the chamber means;
   wherein the selection means is configured as a magnet and a magnetic sensing element;
   wherein one of the magnet and the magnetic sensing element is arranged in the body; and
   wherein another of the magnet and the magnetic sensing element is arranged in the support means wherein the selection means is automatic selection means;
   wherein the beverage brewer includes manual selection means configured to actuate the first mode or the second mode of the flow control means at the direction of a user if the automatic selection means is not engaged to actuate the first mode or the second mode of the flow control means; and
   wherein automatic selection means is configured to override the manual selection means.

2. The beverage brewer of claim 1, wherein the flow-control means includes electrically-controlled valve means for controlling the flow of water to the chamber means.

3. The beverage brewer of claim 1, wherein the flow-control means includes electrically-controlled pump means for controlling the flow of water to the chamber means.

4. The beverage brewer of claim 1, wherein:
   the body includes passage means for fluid communication, and the magnetic sensing element is disposed in the body at a sensing distance to the passage means;
   the support means includes probe means for carrying the magnet; and
   the probe means is configured to enter the passage means such that the magnetic sensing element senses the magnet to actuate the first mode or the second mode of the flow-control means.

5. The beverage brewer of claim 4, further comprising container support coupling means for coupling with the support means to position the probe means within the passage means to actuate the first mode or the second mode of the flow-control means.

6. The beverage brewer of claim 4, further comprising first and second container support coupling means for coupling with the support means to position the probe means within the passage means to actuate the respective first mode or second mode of the flow-control means.

7. The beverage brewer of claim 1, wherein the support means includes hot plate means for maintaining a temperature of a brewed beverage received by a brewed beverage container supported by the support means when the hot plate means is actuated; and
   wherein the selection means is configured to actuate the hot plate means.

8. The beverage brewer of claim 7, wherein the selection means is configured to actuate the hot plate means based on whether the first mode or the second mode of the flow-control means is actuated.

9. The beverage brewer of claim 1, wherein the flow-control means is configured to control the flow of water to the brewing chamber such that in a first mode a first positive quantity of water or in a second mode a second positive quantity of water is provided to the brew chamber; and
   wherein the selection means is configured to actuate the first mode or the second mode of the flow-control means, wherein the first and second modes are active brewing modes.

10. A multi-mode beverage brewer, comprising:
    a body;
    a brewing chamber arranged in the body and configured to receive and contain beverage brewing material, to receive a flow of water from a water source and through the beverage brewing material, thereby brewing a beverage, and to release the brewed beverage through a brewing chamber outlet;
    a flow controller arranged in the body and configured to control the flow of water to the brewing chamber such that in a first mode a first quantity of water or in a second mode a second quantity of water is provided to the brew chamber;

a selector configured to actuate the first mode or the second mode of the flow controller; and a tray, configured to support a brewed beverage container to receive the brewed beverage from the brewing chamber outlet;

wherein the selector is configured as a magnetic element and a magnetic sensing element;

wherein one of the magnetic element and the magnetic sensing element is arranged in the body;

wherein another of the magnetic element and the magnetic sensing element is arranged in the tray;

wherein the selector is an automatic selector;

wherein the beverage brewer includes a manual selector configured to actuate the first mode or the second mode of the flow controller at the direction of a user if the automatic selector is not engaged to actuate the first mode or the second mode of the flow controller; and wherein automatic selector is configured to override the manual selector.

11. The beverage brewer of claim 10, wherein the flow controller includes an electrically-controlled valve.

12. The beverage brewer of claim 10, wherein the flow controller includes an electrically-controlled pump.

13. The beverage brewer of claim 10, wherein;

the body includes a passage, and the magnetic sensing element is disposed in the body at a sensing distance to the passage;

the tray includes a probe carrying the magnetic element; and the probe is configured to enter the passage such that the magnetic sensing element senses the magnetic element to actuate the first mode or the second mode of the flow controller.

14. The beverage brewer of claim 13, further comprising a brewed beverage container support, configured to be coupled with the tray to position the probe within the passage to actuate the first mode or the second mode of the flow controller.

15. The beverage brewer of claim 13, further comprising first and second brewed beverage container supports, configured to be coupled with the tray to position the probe within the passage to actuate the respective first mode or second mode of the flow controller.

16. The beverage brewer of claim 10, wherein the tray includes a hot plate configured to maintain a temperature of a brewed beverage received by a brewed beverage container supported by the tray when the hot plate is actuated.

17. The beverage brewer of claim 16, wherein the selection means is configured to actuate the hot plate.

18. The beverage brewer of claim 17, wherein the selector is configured to actuate the hot plate based on whether the first mode or the second mode of the flow controller is actuated.

19. The beverage brewer of claim 10, wherein the flow controller is configured to control the flow of water to the brewing chamber such that in a first mode a first positive quantity of water or in a second mode a second positive quantity of water is provided to the brew chamber.

20. The beverage brewer of claim 10, wherein the selector is configured to actuate the first mode or the second mode of the flow controller, wherein the first and second modes are active brewing modes.

* * * * *